(12) United States Patent
Urey et al.

(10) Patent No.: US 10,782,570 B2
(45) Date of Patent: Sep. 22, 2020

(54) NEAR-TO-EYE IMAGE DISPLAY DEVICE DELIVERING ENHANCED VIEWING EXPERIENCE

(71) Applicant: CY VIsion Inc., Mountain View, CA (US)

(72) Inventors: Hakan Urey, Sariyer/Istanbul (TR); Erdem Ulusoy, Sariyer/Istanbul (TR); Goksen Goksenin Yaralioglu, Istanbul (TR)

(73) Assignee: CY Vision Inc., San Jose, CA (US)

( * ) Notice: Subject to any disclaimer, the term of this patent is extended or adjusted under 35 U.S.C. 154(b) by 0 days.

(21) Appl. No.: 16/088,065

(22) PCT Filed: Mar. 25, 2016

(86) PCT No.: PCT/TR2016/050083
§ 371 (c)(1),
(2) Date: Sep. 24, 2018

(87) PCT Pub. No.: WO2017/164827
PCT Pub. Date: Sep. 28, 2017

(65) Prior Publication Data
US 2019/0250439 A1    Aug. 15, 2019

(51) Int. Cl.
*G02F 1/1343*    (2006.01)
*G02F 1/1335*    (2006.01)
(Continued)

(52) U.S. Cl.
CPC ....... *G02F 1/1343* (2013.01); *G02B 27/0172* (2013.01); *G02F 1/133526* (2013.01);
(Continued)

(58) Field of Classification Search
CPC ............ G02F 1/136209; G02F 1/1343; G02F 1/133526; G02F 1/133555; G02B 27/0172; G02B 26/0833; G02B 2027/0174
See application file for complete search history.

(56) References Cited

U.S. PATENT DOCUMENTS 4,311,999 A    1/1982  Upton et al.
5,299,289 A *  3/1994  Omae ............... G02F 1/133371
                                          348/E9.027
(Continued)

FOREIGN PATENT DOCUMENTS

CA         2916836 A2     1/2016
JP         2003248189     9/2003
(Continued)

OTHER PUBLICATIONS

Mengu, et al., "Non-iterative phase hologram computation for low speckle holographic image projection", "Optics Express", Feb. 23, 2016, pp. 4462-4476, vol. 24, No. 5.
(Continued)

*Primary Examiner* — Michael H Caley
*Assistant Examiner* — Mariam Qureshi
(74) *Attorney, Agent, or Firm* — Charles A. Lemaire; Jonathan M. Rixen; Lemaire Patent Law Firm, P.L.L.C.

(57) ABSTRACT

The present invention generally concerns a near-to-eye display device having improved viewing quality. The present invention more particularly pertains to an image display device (35) comprising at least one point light source (23) and at least one micro-display device in the form of a spatial light modulator (11) positioned to be illuminated by said at least one point light source (23), said at least one micro-display device having pixels (12) arranged in a two-dimen-
(Continued)

Figure 1:
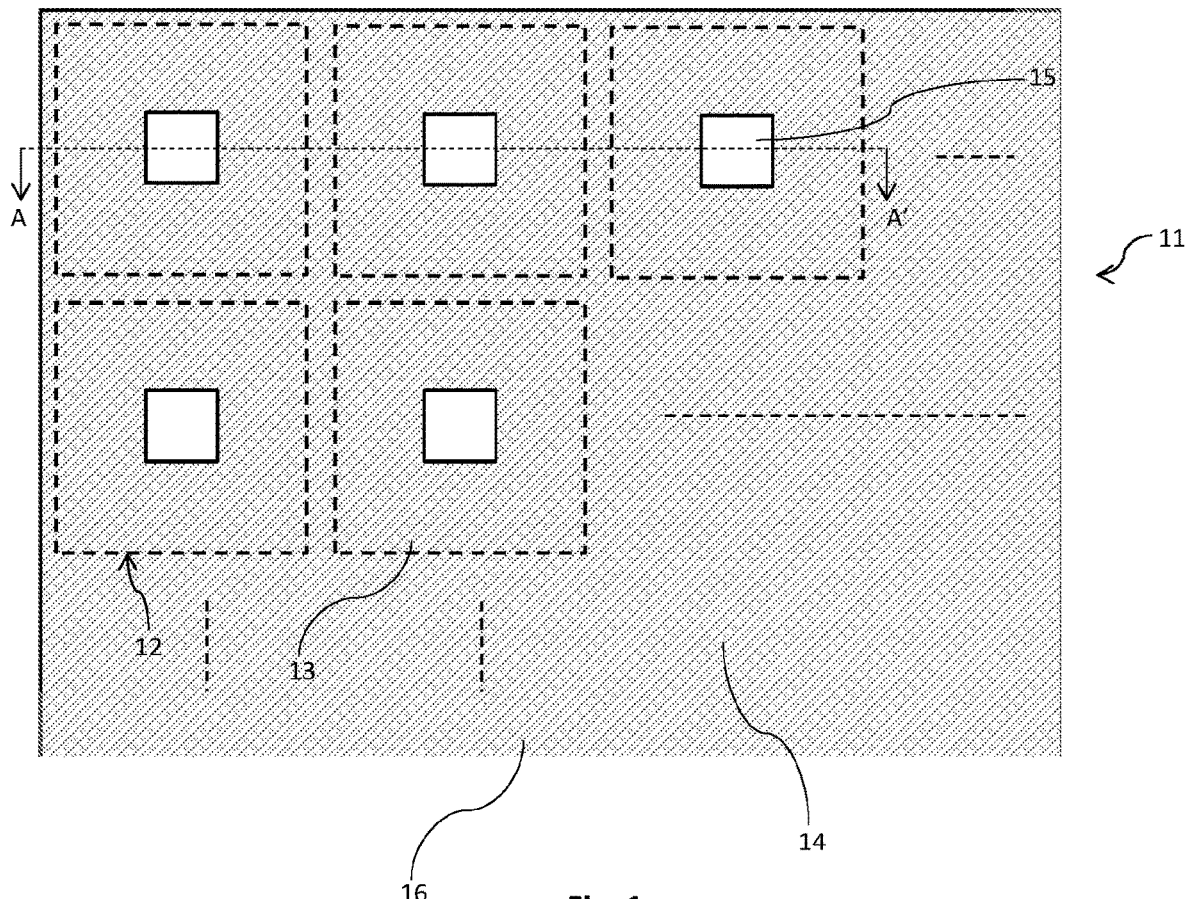

sional array where each pixel (12) is represented by a substantially planar pixel electrode (13).

22 Claims, 28 Drawing Sheets

(51) Int. Cl.
*G02F 1/1362* (2006.01)
*G02B 27/01* (2006.01)
*G06K 9/00* (2006.01)
G02B 26/08 (2006.01)
G02F 1/135 (2006.01)

(52) U.S. Cl.
CPC .. *G02F 1/133553* (2013.01); *G02F 1/136209* (2013.01); *G06K 9/00617* (2013.01); *G02B 26/0808* (2013.01); *G02B 26/0833* (2013.01); *G02B 2027/0123* (2013.01); *G02B 2027/0174* (2013.01); *G02B 2027/0178* (2013.01); *G02F 1/133504* (2013.01); *G02F 1/133555* (2013.01); *G02F 1/136277* (2013.01); *G02F 2001/1351* (2013.01); *G02F 2001/133565* (2013.01); *G02F 2201/34* (2013.01); *G02F 2203/01* (2013.01); *G02F 2203/02* (2013.01)

(56) References Cited

U.S. PATENT DOCUMENTS

| | | | |
|---|---|---|---|
| 5,654,782 A * | 8/1997 | Morokawa | G02F 1/134336 349/143 |
| 6,046,840 A * | 4/2000 | Huibers | G02B 26/0833 359/224.1 |
| 7,850,306 B2 | 12/2010 | Uusitalo et al. | |
| 8,049,941 B2 | 11/2011 | Haussler | |
| 8,294,966 B2 | 10/2012 | Kroll et al. | |
| 8,400,696 B2 | 3/2013 | Ikeda et al. | |
| 8,934,160 B2 | 1/2015 | Sun | |
| 9,291,828 B2 | 3/2016 | Kroll et al. | |
| 9,383,582 B2 | 7/2016 | Tang et al. | |
| 9,406,166 B2 | 8/2016 | Futterer | |
| 9,756,317 B2 | 9/2017 | Kim et al. | |
| 9,779,643 B2 | 10/2017 | Bohn et al. | |
| 9,874,744 B2 | 1/2018 | Bailey et al. | |
| 2005/0024754 A1 | 2/2005 | Epstein et al. | |
| 2005/0052376 A1 | 3/2005 | Shivji | |
| 2010/0149073 A1 | 6/2010 | Chaum et al. | |
| 2010/0202725 A1* | 8/2010 | Popovich | G02B 27/48 385/10 |
| 2010/0259804 A1 | 10/2010 | Buschbeck et al. | |
| 2011/0001804 A1 | 1/2011 | Urey et al. | |
| 2011/0128471 A1 | 6/2011 | Suckling et al. | |
| 2014/0146394 A1 | 5/2014 | Tout et al. | |
| 2014/0267636 A1* | 9/2014 | Takagi | H04N 13/324 13/324 |
| 2015/0293409 A1* | 10/2015 | Usukura | G03H 1/2294 349/15 |
| 2017/0068091 A1* | 3/2017 | Greenberg | G02B 26/101 |

FOREIGN PATENT DOCUMENTS

| | | |
|---|---|---|
| WO | WO_2007027019 A1 | 3/2007 |
| WO | WO_2008065569 | 6/2008 |
| WO | WO_2014063716 | 5/2014 |
| WO | WO_2014209244 | 12/2014 |
| WO | WO_2015032824 | 3/2015 |

OTHER PUBLICATIONS

"PCT Search Report/Written Opinion for parent PCT/TR2016/050083 application, dated Dec. 21, 2016, 10 pages."

Chiu, et al., "Paper No. S7.3: Holographic Direct View System With 4K2K LCOS SLM and LED Reconstruction Light Source", "SID International Symposium Digest of Technical Papers", Sep. 1, 2015, p. 31, vol. 46, No. SI.

Desmet, et al., "Invited Paper: Microdisplays with High Pixel Counts", "2001 SID International Symposium—Jun. 3-8, 2001, San Jose Convention Center, California", Jun. 3, 2001.

Michalkiewicz, et al., "Holographic three-dimensional displays with liquid crystal on silicon spatial light modulator", "Proceedings of SPIE", Jan. 1, 2004, pp. 85-94, vol. 5531.

Reichelt, et al., "Holographic 3-D Displays—Electro-holography", "In: Advances in Lasers and Electro Optics (Chapter 29) Available on internet at: http://www.intechopen.com", Apr. 1, 2010, Publisher: Intech XP055149317.

* cited by examiner

Figure 5F:
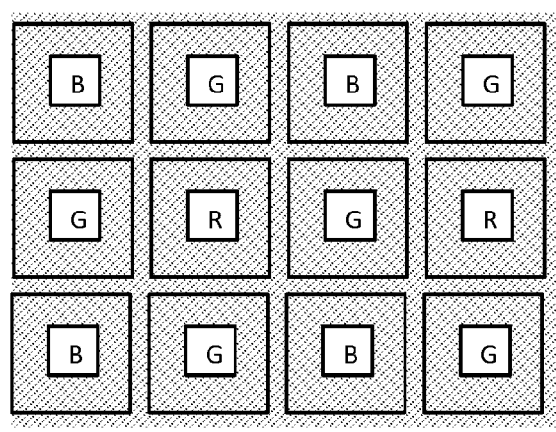

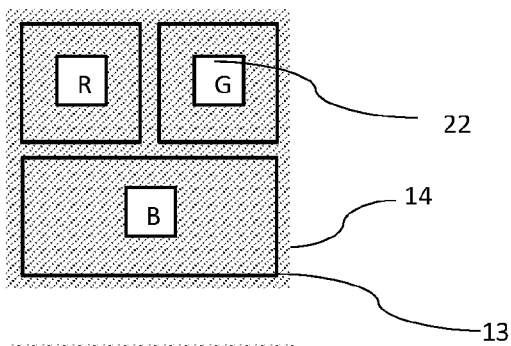
Fig. 5a
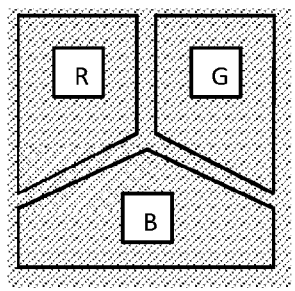
Fig. 5b
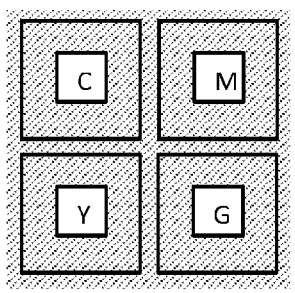
Fig. 5c
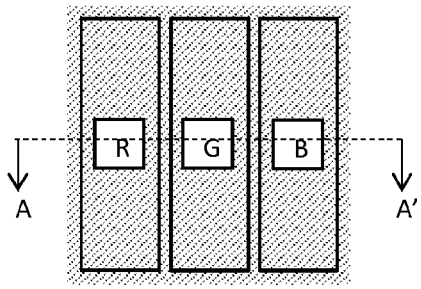
Fig. 5d
Fig. 5e
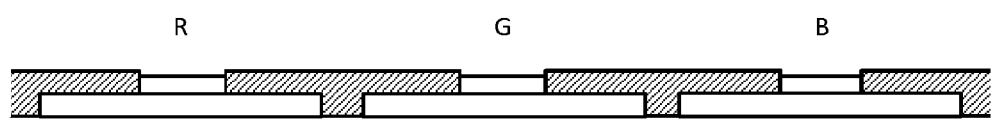

1

2

3

4

5

6

Figure 9D:
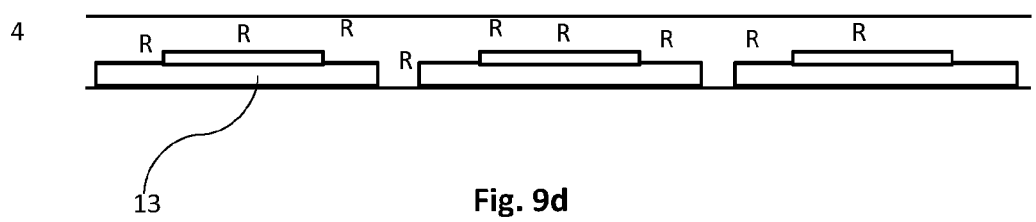
Figure 9E:
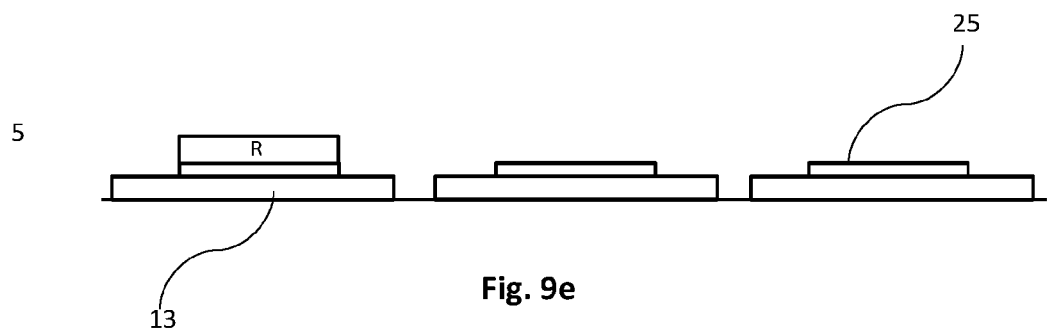
Figure 9F:
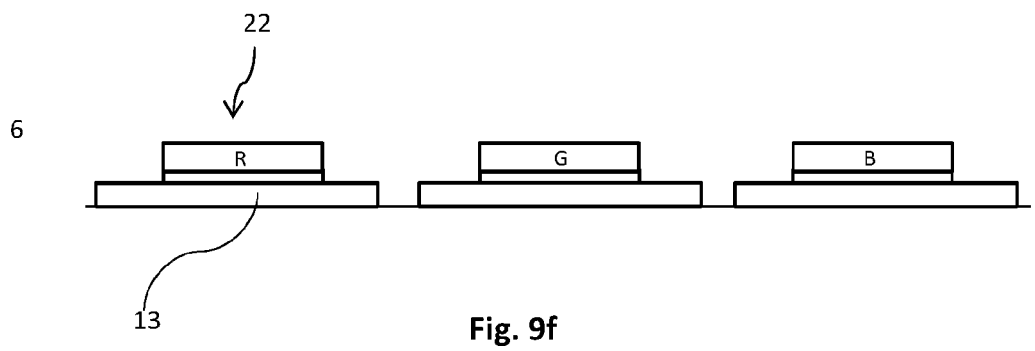

1
13  Fig. 9a
2
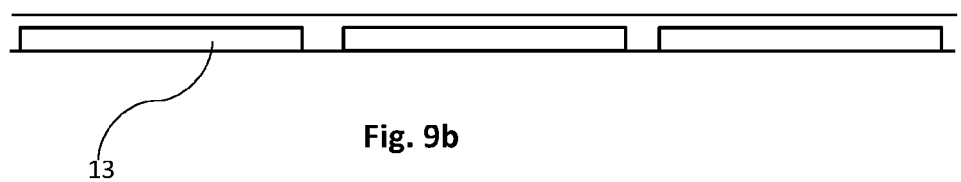
13  Fig. 9b
3
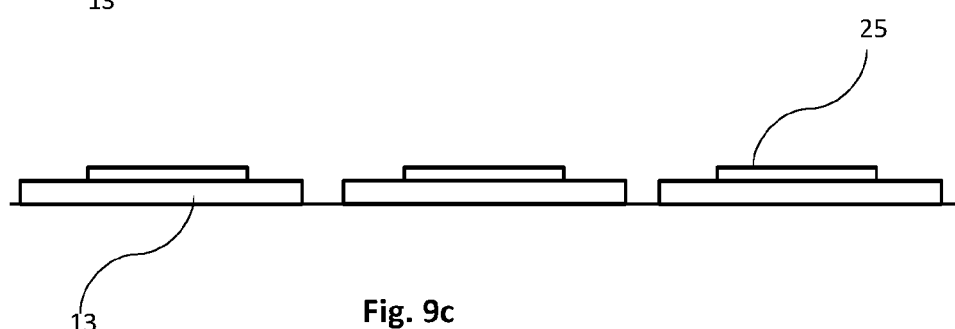
13  Fig. 9c

NEAR-TO-EYE IMAGE DISPLAY DEVICE DELIVERING ENHANCED VIEWING EXPERIENCE

CROSS-REFERENCE TO RELATED APPLICATION

This United States patent application is a national-phase filing of, and claims priority benefit of, PCT Patent Application No. PCT/TR2016/050083, filed Mar. 25, 2016 and titled "NEAR-TO-EYE IMAGE DISPLAY DEVICE DELIVERING ENHANCED VIEWING EXPERIENCE," which is incorporated herein by reference in its entirety.

TECHNICAL FIELD OF THE PRESENT INVENTION

The present invention generally concerns a near-to-eye display device having improved viewing quality.

PRIOR ART/BACKGROUND OF THE PRESENT INVENTION

Head-worn displays (HWD) typically comprise a micro-display on which a two dimensional (2D) regular image is displayed. Some blurred image forms on the retina unless relay optics are placed in between due to the physical distance between the micro-display and the eye, which is typically much smaller than 25 cm (the closest distance at which the human eye can normally focus). The relay optics typically consist of several lenses which serve to form a magnified virtual image of the micro-display beyond 25 cm (mostly at infinity) on which the eye can then focus and form a sharp retinal image.

Lightweight HWD designs that comprise micro-displays (those that use only a single magnifier lens, for instance) are mostly restricted to systems having small fields of view (FOV), since weight and bulk increase for large FOV designs due to additional components inserted to compensate for aberrations.

As an example, the recently emerging HWD devices having a quite thin form factor, basically consists of a small (~1 cm diagonal) micro-display and a simple positive lens, but has a limited FOV, beyond which aberrations become severe. On the other hand, high end military-type displays may support a FOV approaching 150 degrees or more, but weigh as much as 5 kg or more and may contain more than 10 different lenses, most of which are present to compensate for aberrations that emerge due to the enlarged FOV. Having so many lenses is not merely a technological problem, but an essential one, since no single optical component can be designed to form an aberration free image of a large size micro-display, due to the fact that the information emerging from the micro-display quickly gets spread in space as it propagates.

Micro-display based HWD designs also fall short of providing the ultimate three dimensional (3D) visual experience. These HWD designs typically provide only stereoscopic images, which invoke 3D perception essentially only through binocular disparity. Monocular cues, especially accommodation, are typically not supported, or are incorrect. Users of stereoscopic systems typically suffer from visual fatigue caused by the so-called accommodation-convergence conflict, in which eyes converge truly to the apparent position of a 3D object while accommodation is set incorrectly to the screen so as to make retinal images sharp. The fatigue is especially severe when virtual objects are closer than 50 cm.

Objects of the Present Invention

Primary object of the present invention is to provide an image display device comprising at least one point light source and at least one micro-display device in the form of a spatial light modulator positioned to be illuminated by said at least one point light source, said at least one micro-display device having pixels arranged in a two-dimensional array where each pixel is represented by a substantially planar pixel electrode.

The present invention provides an image display device overcoming the aforementioned inconveniences, which is defined in the characterized portion of claim 1.

BRIEF DESCRIPTION OF THE FIGURES OF THE PRESENT INVENTION

Accompanying drawings are given solely for the purpose of exemplifying a micro-display device whose advantages over prior art were outlined above and will be explained in brief hereinafter.

The drawings are not meant to delimit the scope of protection as identified in the claims nor should they be referred to alone in an effort to interpret the scope identified in said claims without recourse to the technical disclosure in the description of the present invention.

FIG. 1 demonstrates top view of an image display device pixels with reflective zones in a Liquid Crystal on Silicon (LCoS) setup according to the present invention.

Figure 2A:
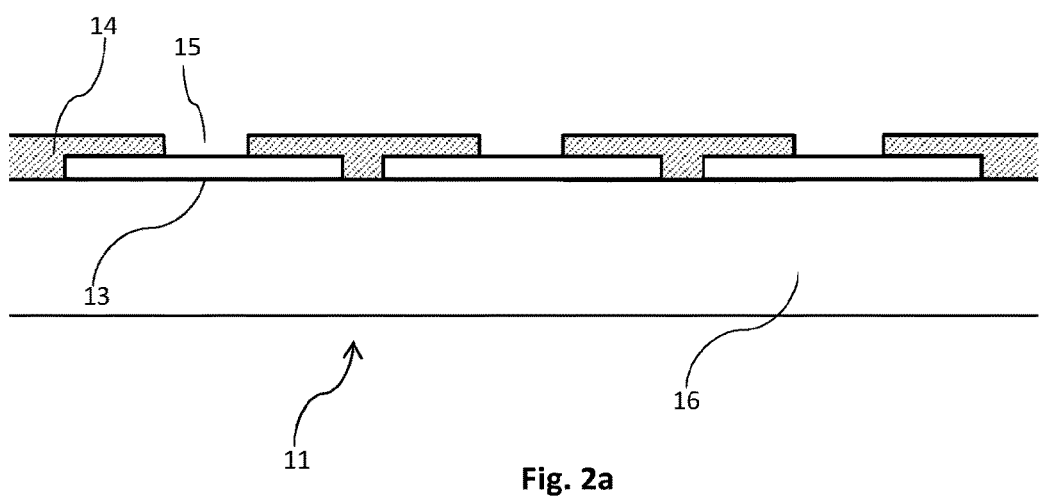
Figure 2B:
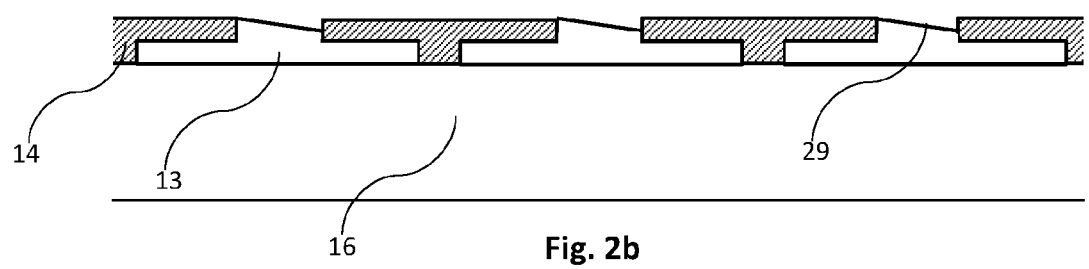
Figure 2C:
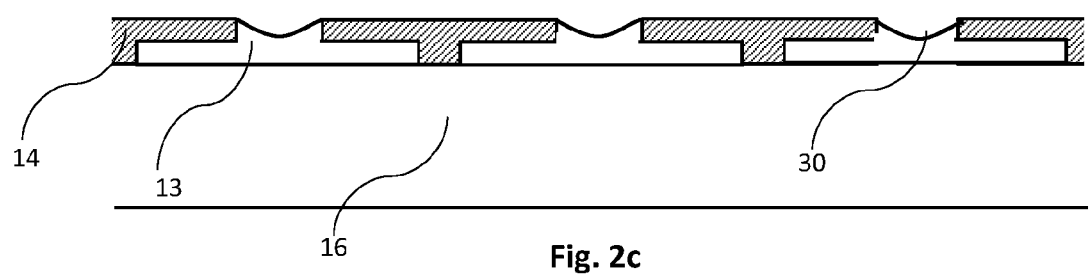
Figure 2D:
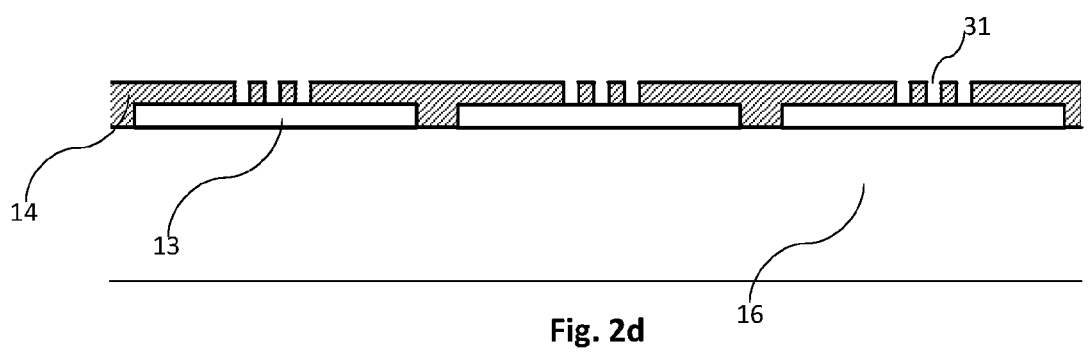
Figure 2E:
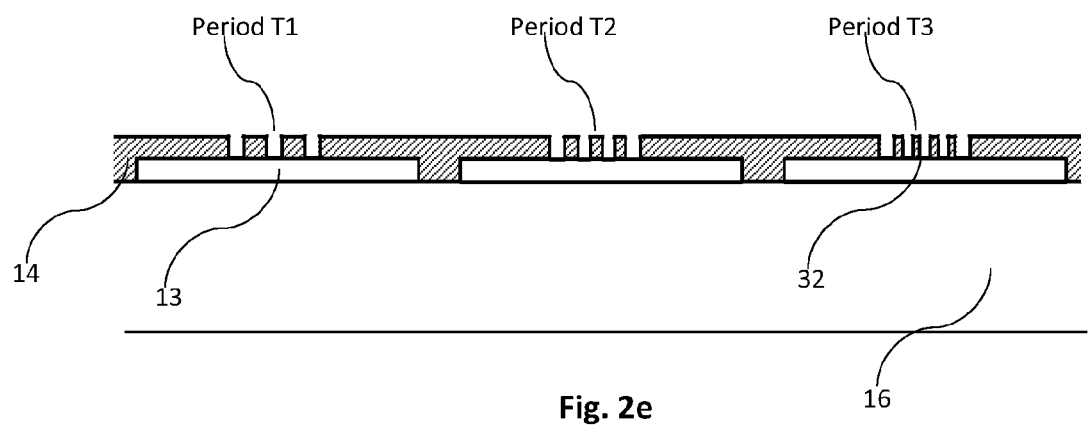

FIGS. 2a to 2e demonstrate cross-sectional views of the configuration as shown in FIG. 1 taken along line A-A' of FIG. 1 according to the present invention. Only the substrate and the electrodes are included in FIG. 2. FIG. 2a demonstrates optically active zones as reflective zones. FIG. 2b demonstrates optically active zones as covered by tilted micro-mirrors. FIG. 2c demonstrates optically active zones as covered by micro-lenses. FIG. 2d demonstrates optically active zones having diffraction gratings. FIG. 2e demonstrates optically active zones having varying period diffraction gratings.

Figure 3A:
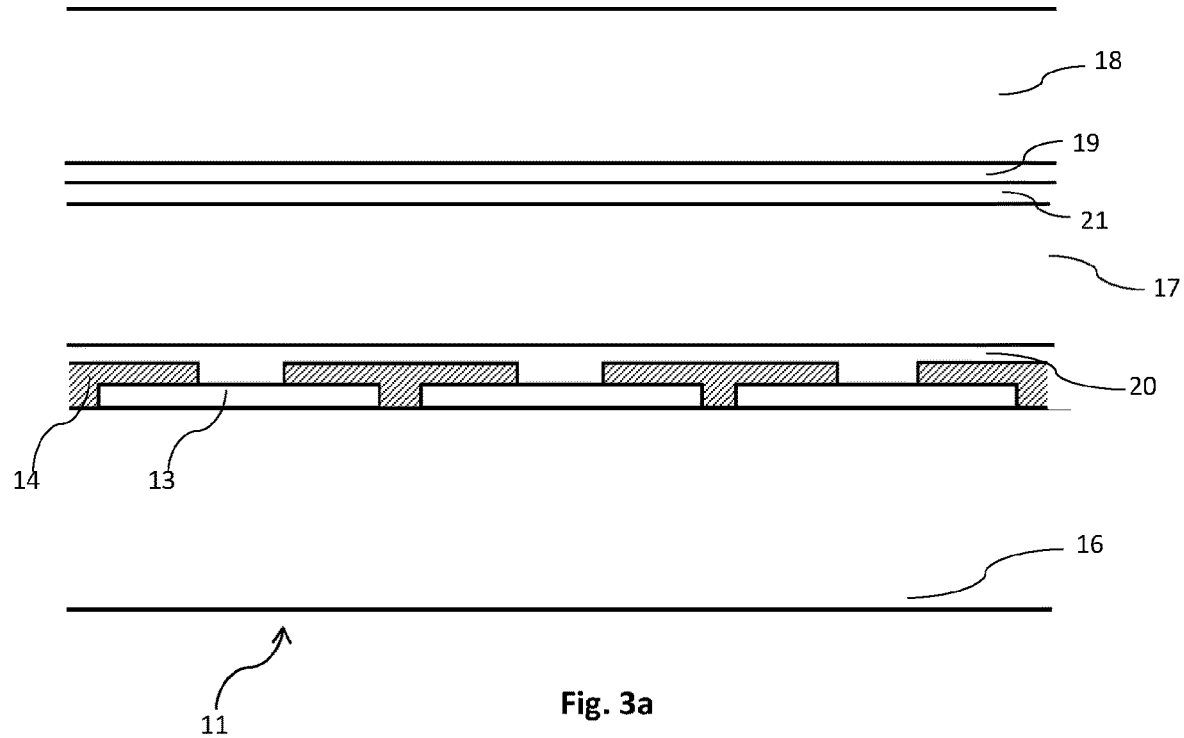

FIG. 3a demonstrates side view of a micro-display having a reflective spatial light modulator based on LCoS configuration according to the present invention.

Figure 3B:
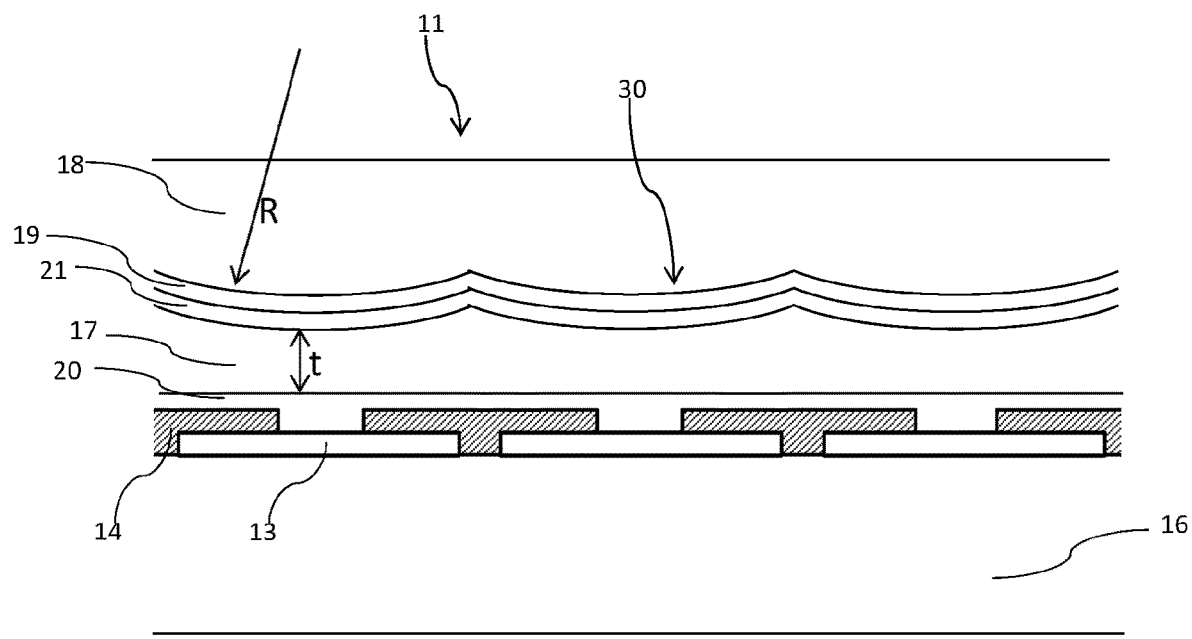
Figure 3C:
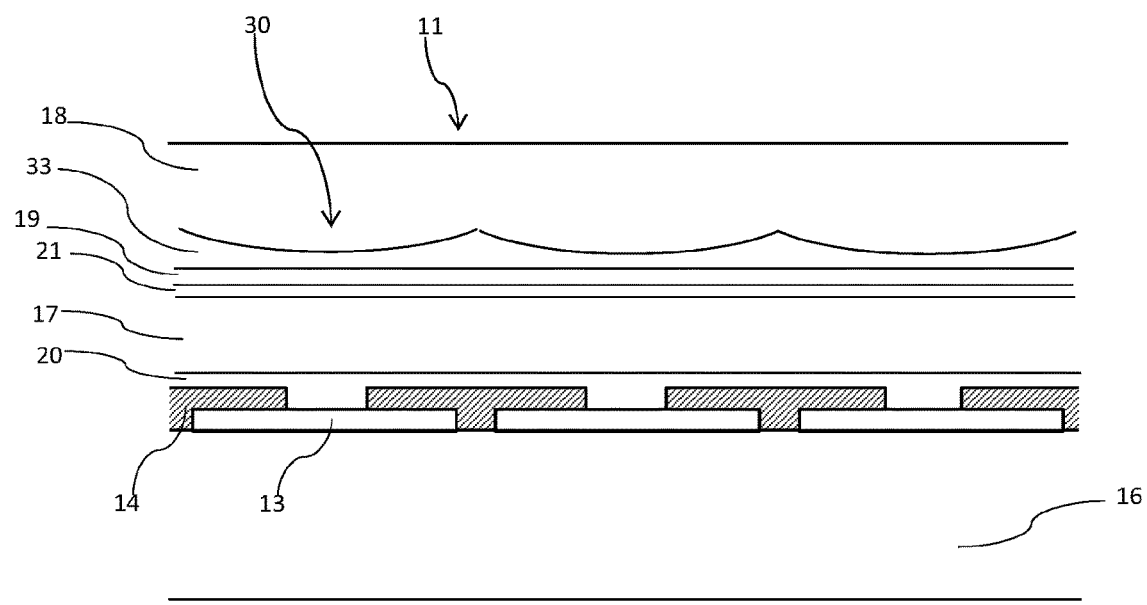
Figure 3D:
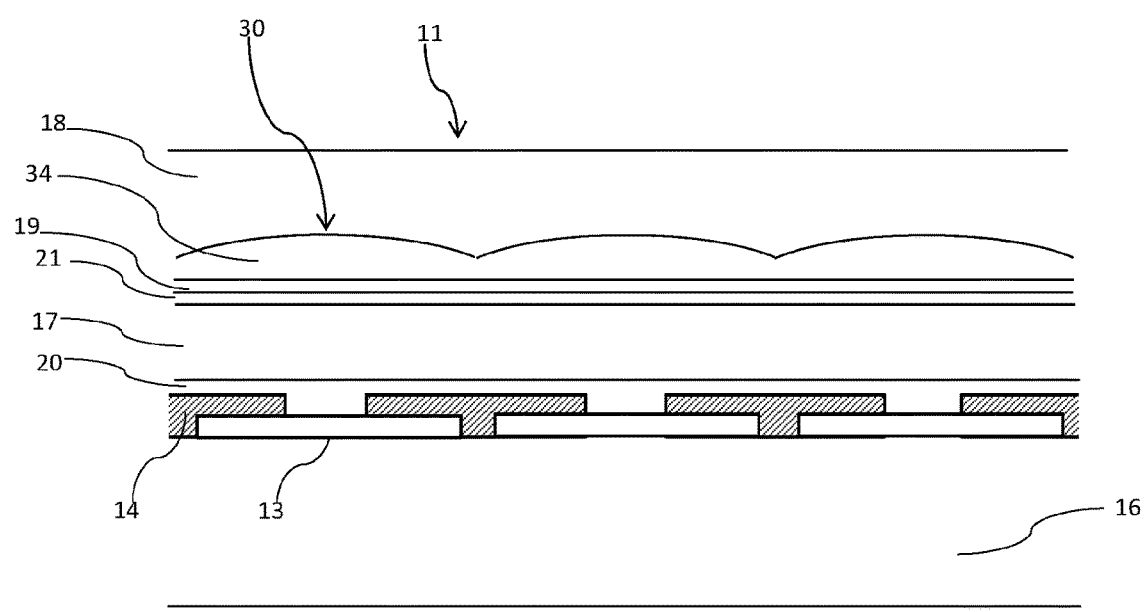

FIG. 3b demonstrates a configuration with micro-lenses disposed in a spaced-away position relative to the optically active zones such that they expand numerical aperture. The radius of curvature of the lenses is denoted by R and the location of the micro-lens array from the pixel electrodes is denoted by t in the figure. FIG. 3c demonstrates a configuration where the lens array is embedded in the top cover to provide a flat surface for liquid crystal interface. FIG. 3d demonstrates a configuration where the lens array is embedded in the top cover to provide a flat surface for liquid crystal interface.

Figure 4:
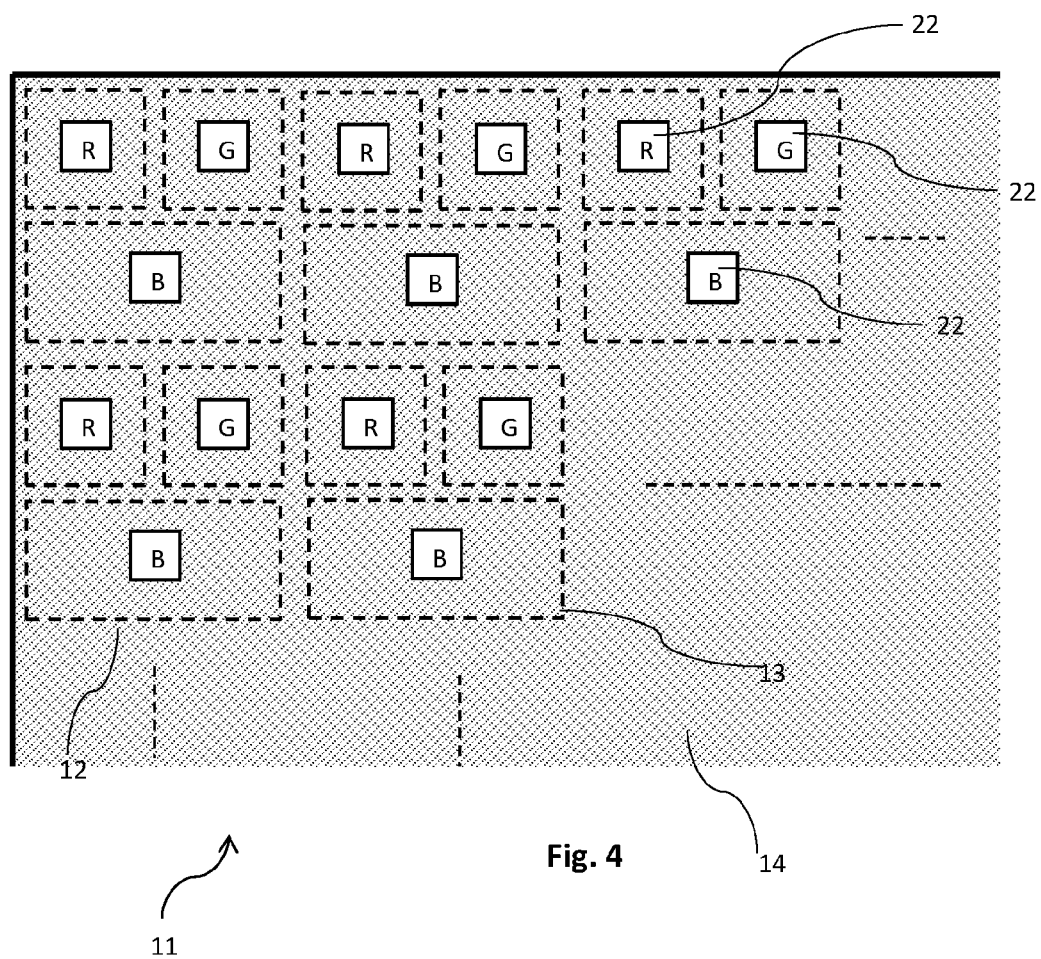

FIG. 4 demonstrates top view of an image display device pixels with color filters according to the present invention.

FIG. 5a to FIG. 5d demonstrate various pixel electrode geometries according to the present invention. FIG. 5e demonstrates a cross-sectional view of the configuration of FIG. 5d. FIG. 5f demonstrates top view of a Bayer code configuration according to the present invention.

Figure 6A:
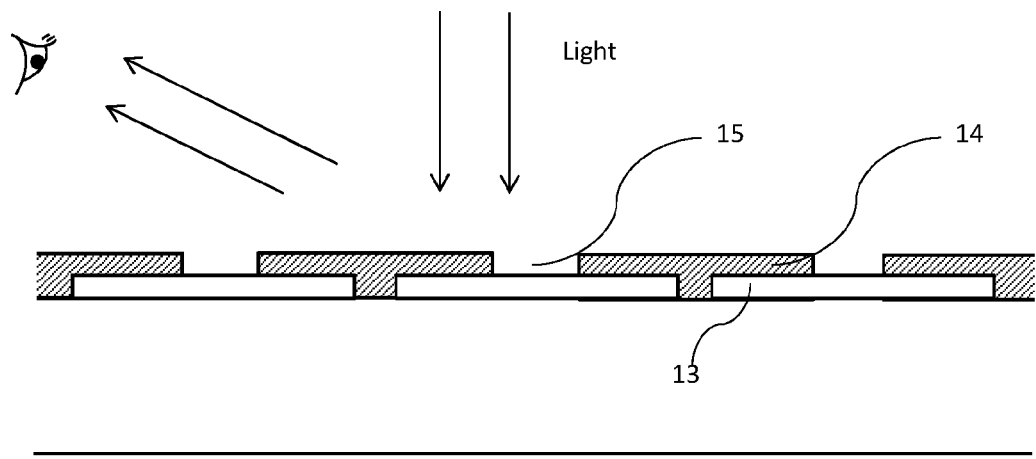
Figure 6B:
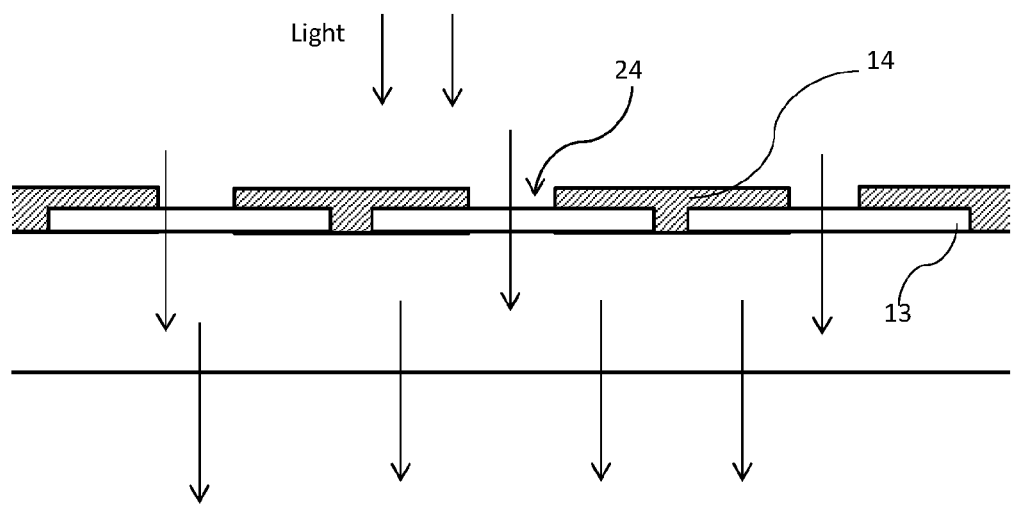
Figure 6C:
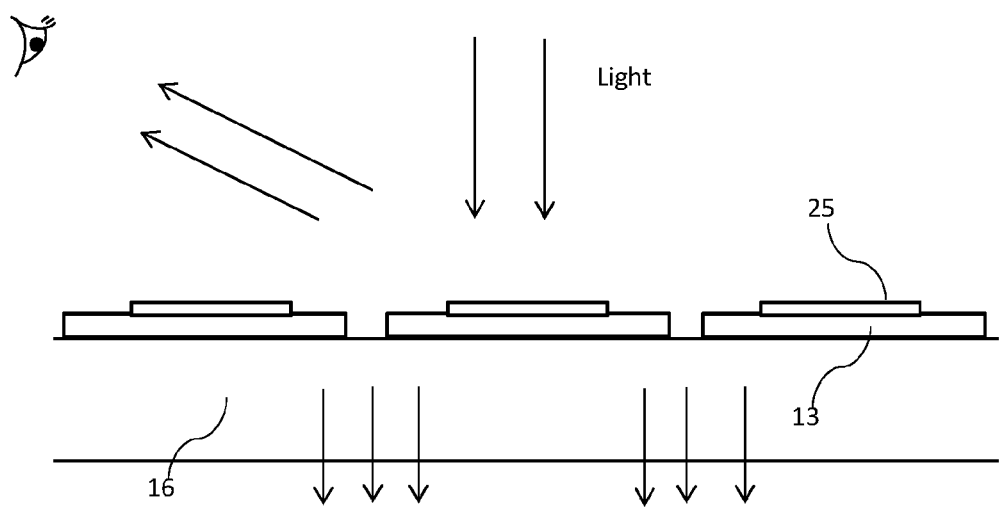

FIG. 6a to FIG. 6c demonstrate different configurations of pixels on transparent and non-transparent substrates according to different embodiments of the present invention. While FIG. 6a demonstrates a reflective zone on a non-transparent substrate (LCoS), FIG. 6b demonstrates a transmissive zone on a transparent substrate and FIG. 6c demonstrates a reflective coating for the optically active zone on a transparent substrate.

Figure 6D:
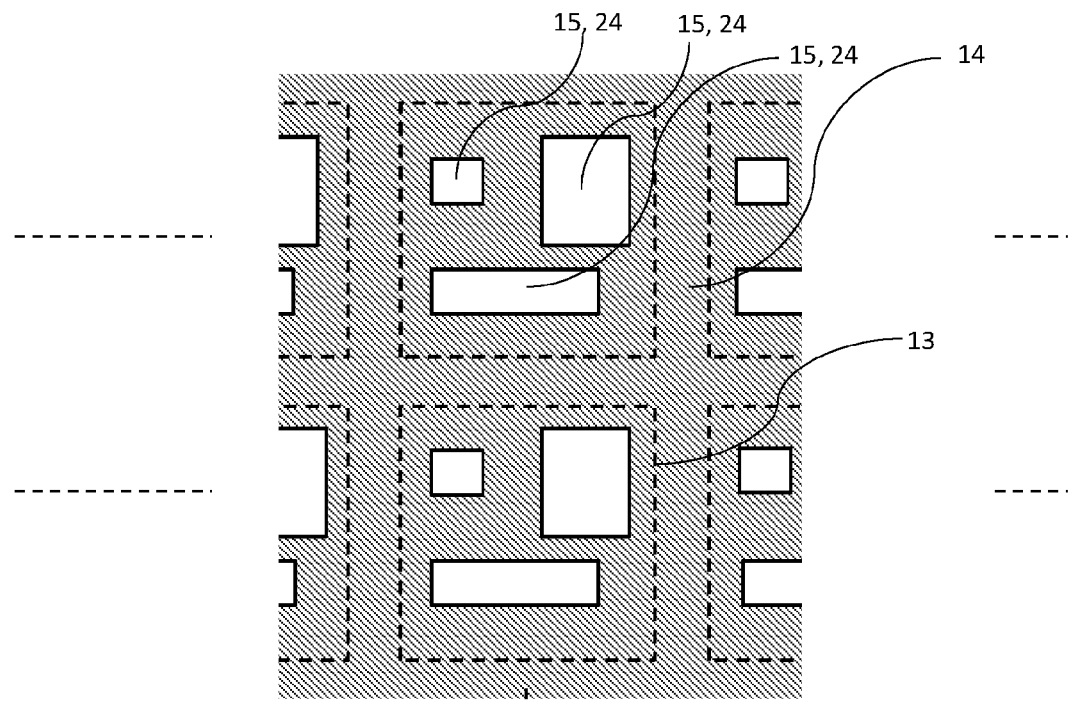
Figure 6E:
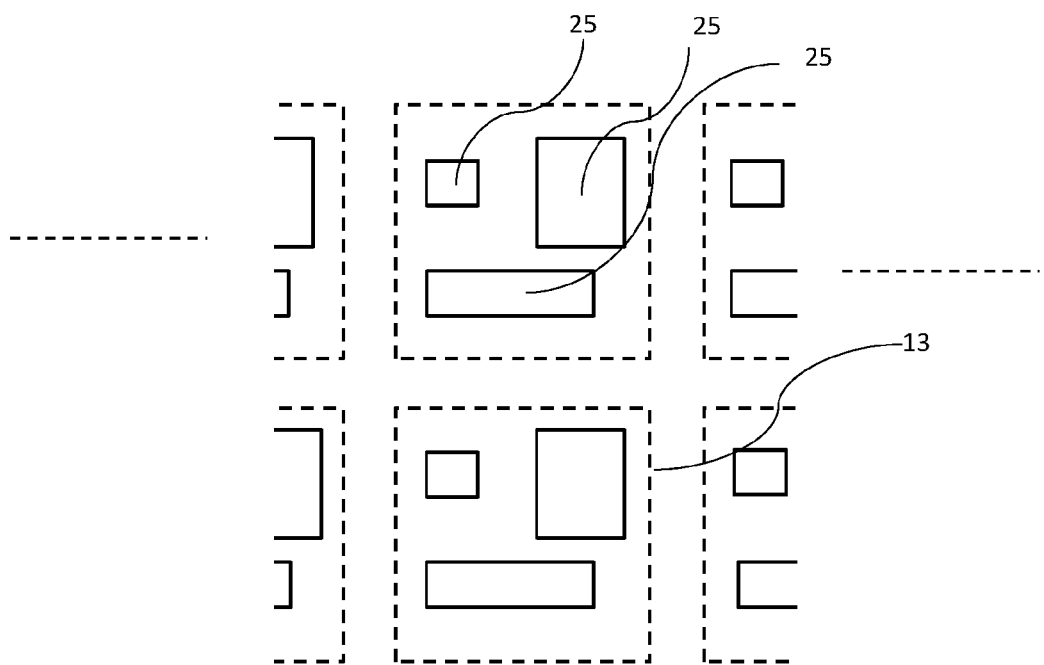
Figure 6F:
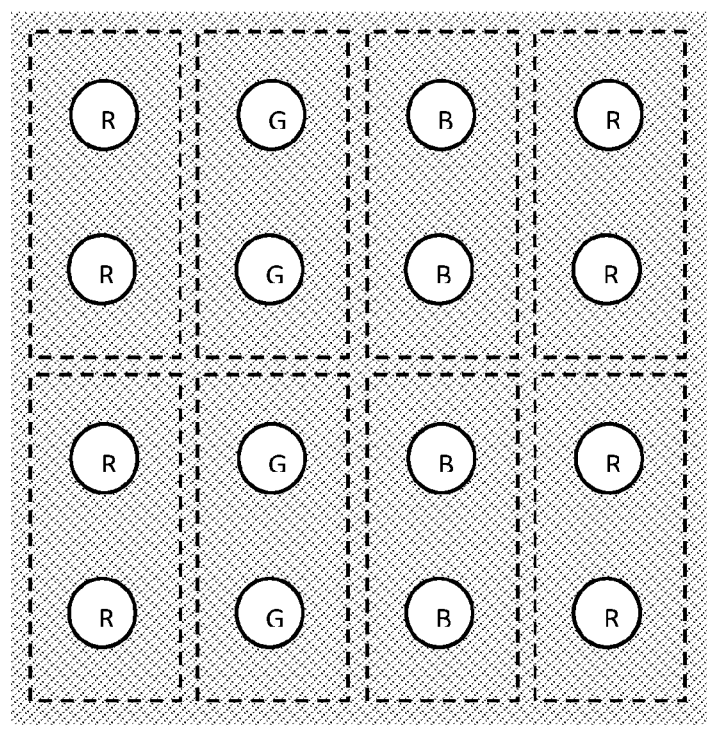
Figure 7A:
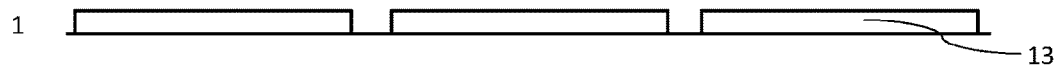
Figure 7B:
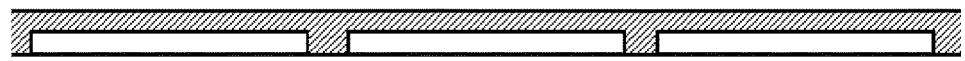
Figure 7C:
Figure 7D:
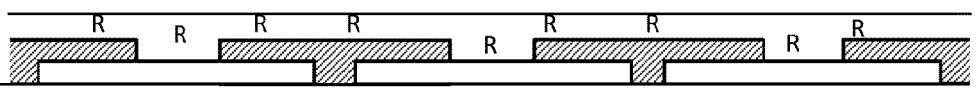
Figure 7E:
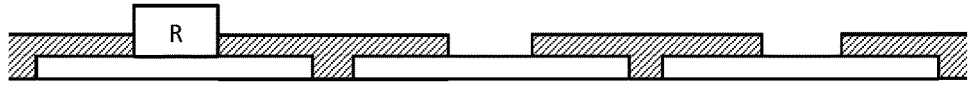
Figure 7F:
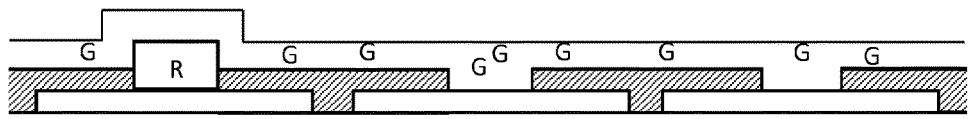
Figure 7G:
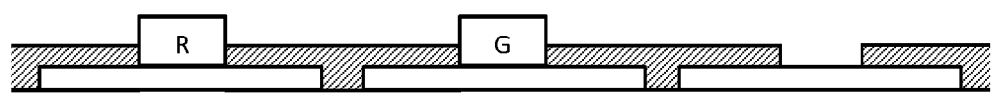
Figure 7H:
Figure 7I:
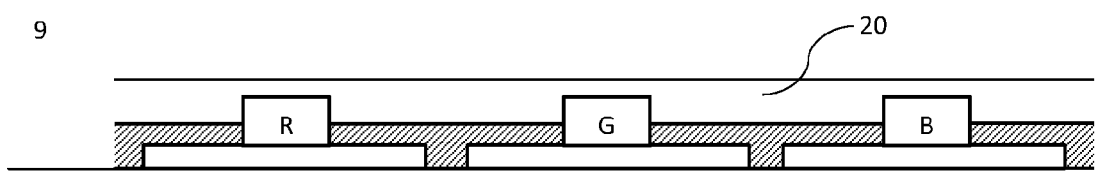

FIGS. 6d to 6f respectively demonstrate reflective or transmissive zones and reflective coatings. The reflective or transmissive zones of FIG. 6d may have a transparent or non-transparent substrate and the embodiment of FIG. 6e have transparent pixel electrode on which at least one reflective coating is disposed. Both figures depict multiple optically active zones on a single pixel electrode, said zones having varying sizes. FIG. 6f is another example of reflective zones on a non-transparent substrate where there are two color filters per each pixel.

FIGS. 7a to 7i demonstrate the fabrication process of a micro-display on a transparent or non-transparent substrate with color filters according to the present invention. Pixel electrodes could be reflective for non-transparent substrate or transmissive for transparent substrate.

Figure 8A:
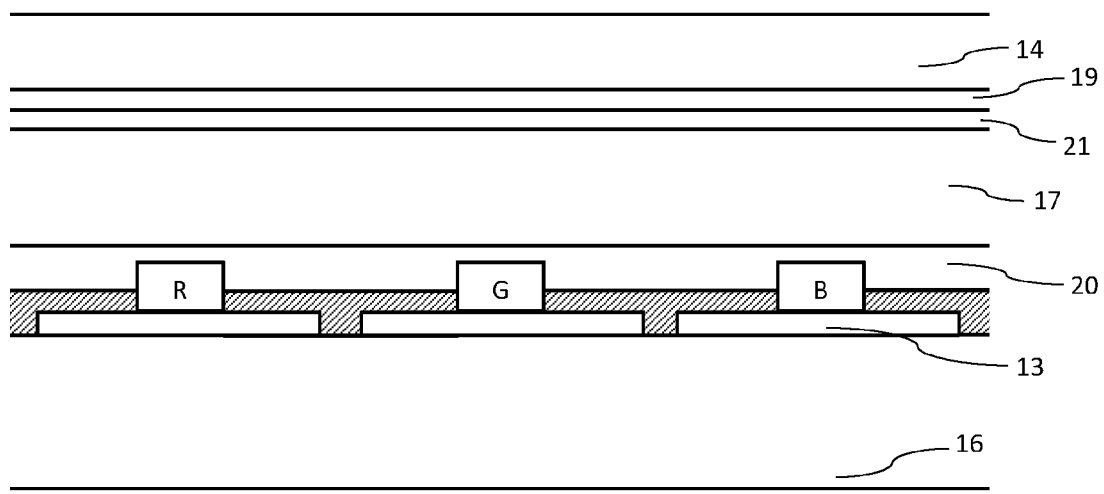
Figure 8B:
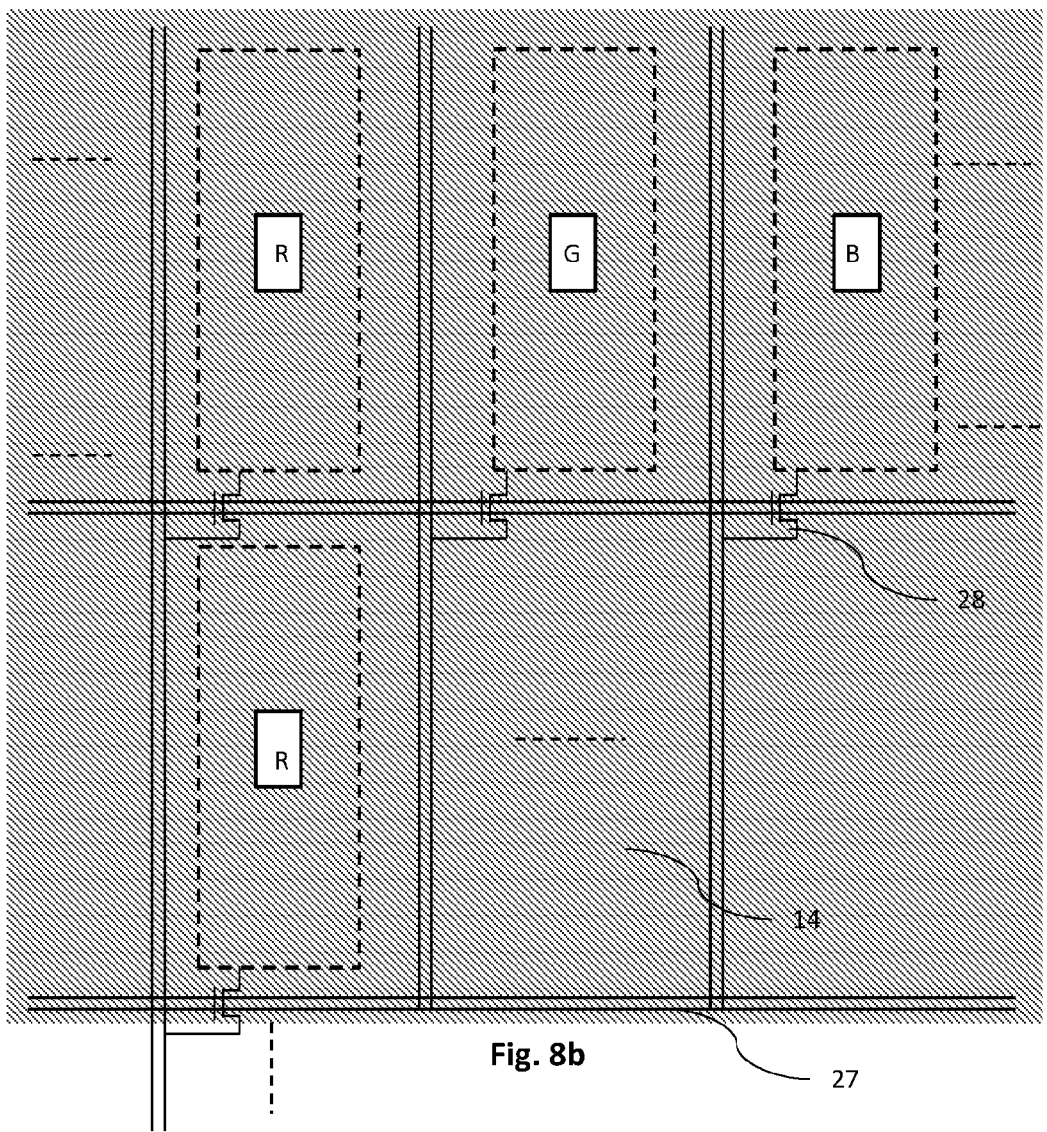

FIG. 8a demonstrates side view of a micro-display having a transmissive spatial light modulator according to the present invention. FIG. 8b demonstrates top view of an image display device pixels with transmissive zones according to the present invention.

FIGS. 9a to 9f demonstrate the fabrication process of a micro-display having reflective coatings with color filters on a transparent substrate according to the present invention.

Figure 10:
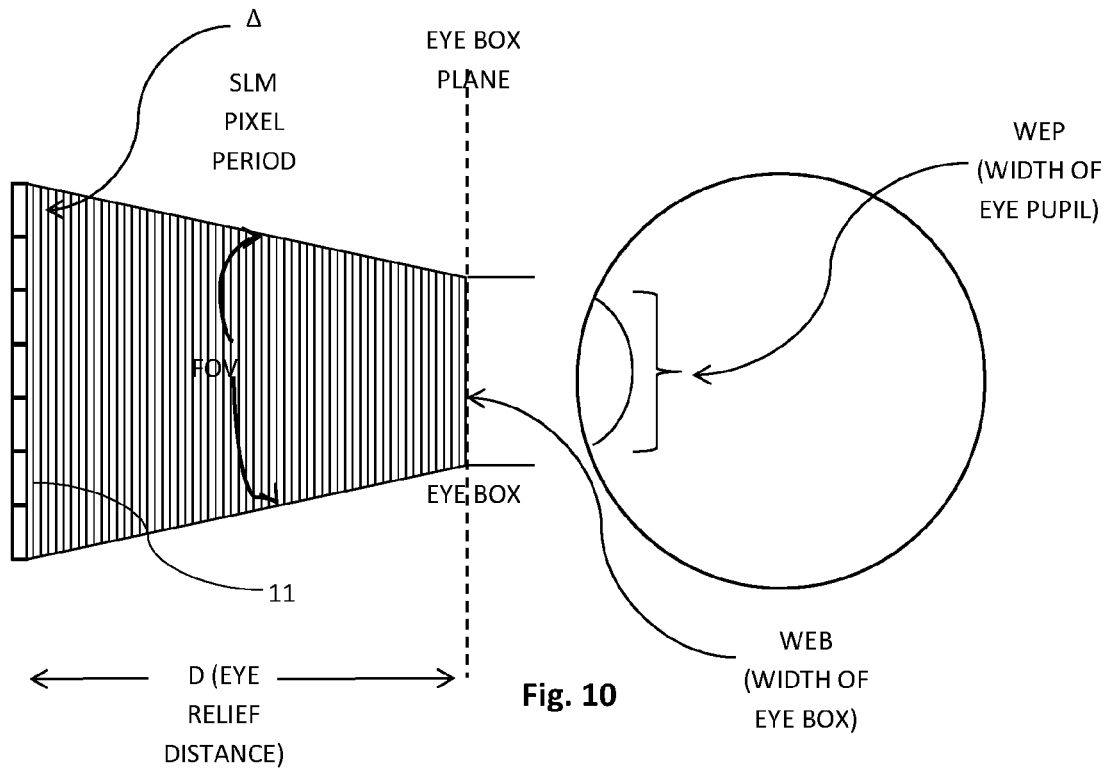

FIG. 10 demonstrates the optical architecture of a head-worn image display device.

Figure 11:
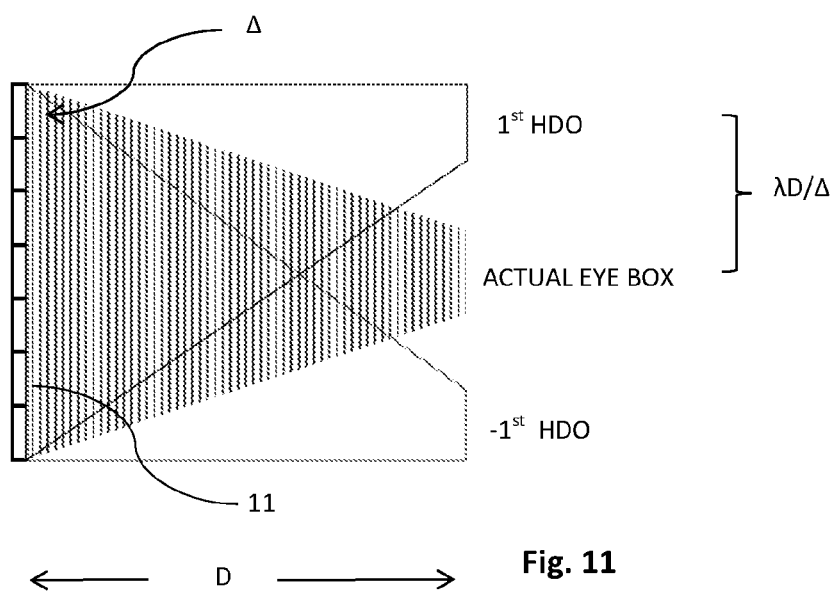

FIG. 11 demonstrates higher diffraction copies generated by a spatial light modulator due to its pixelated structure.

Figure 12A:
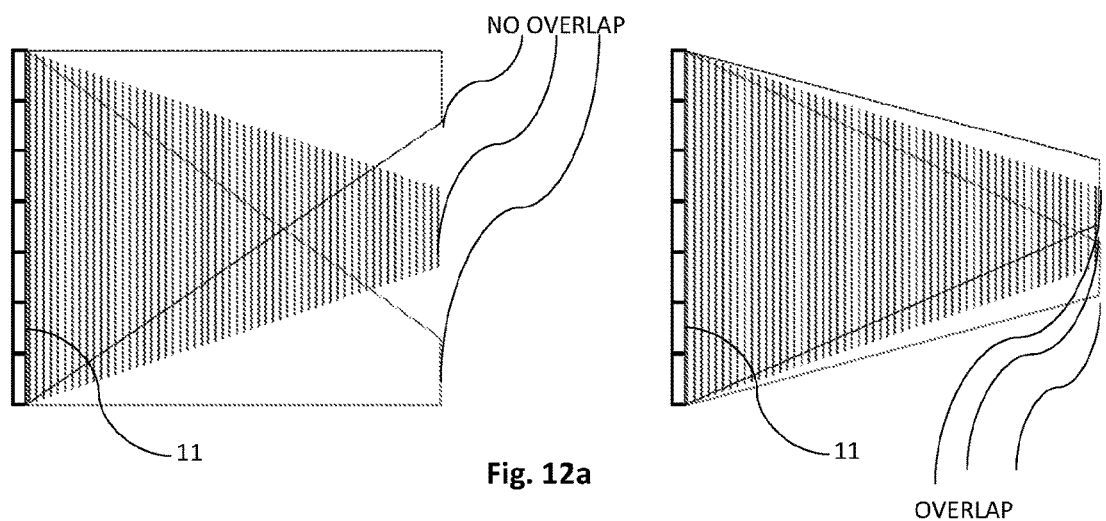
Figure 12B:
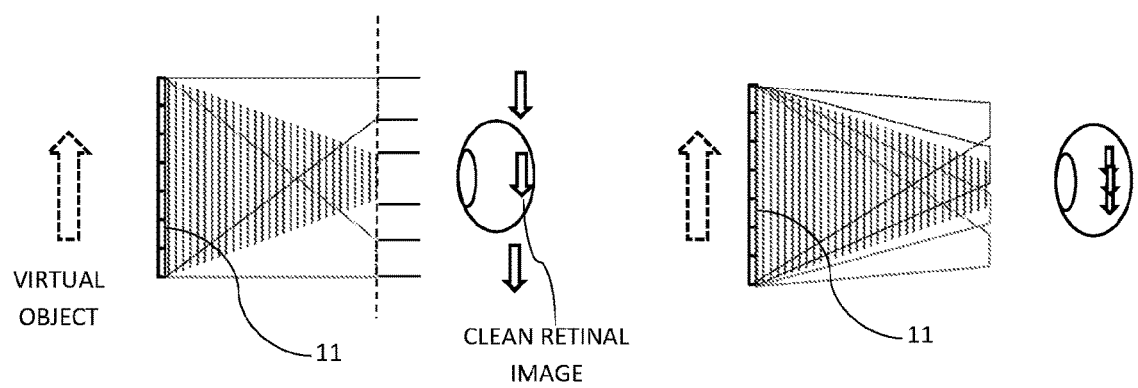

FIG. 12a demonstrates higher diffraction copies generated by a spatial light modulator respectively in the case of a clear eye box and a contaminated eye box. FIG. 12b demonstrates the condition for clear retinal image formation with no ghost artifacts.

Figure 13A:
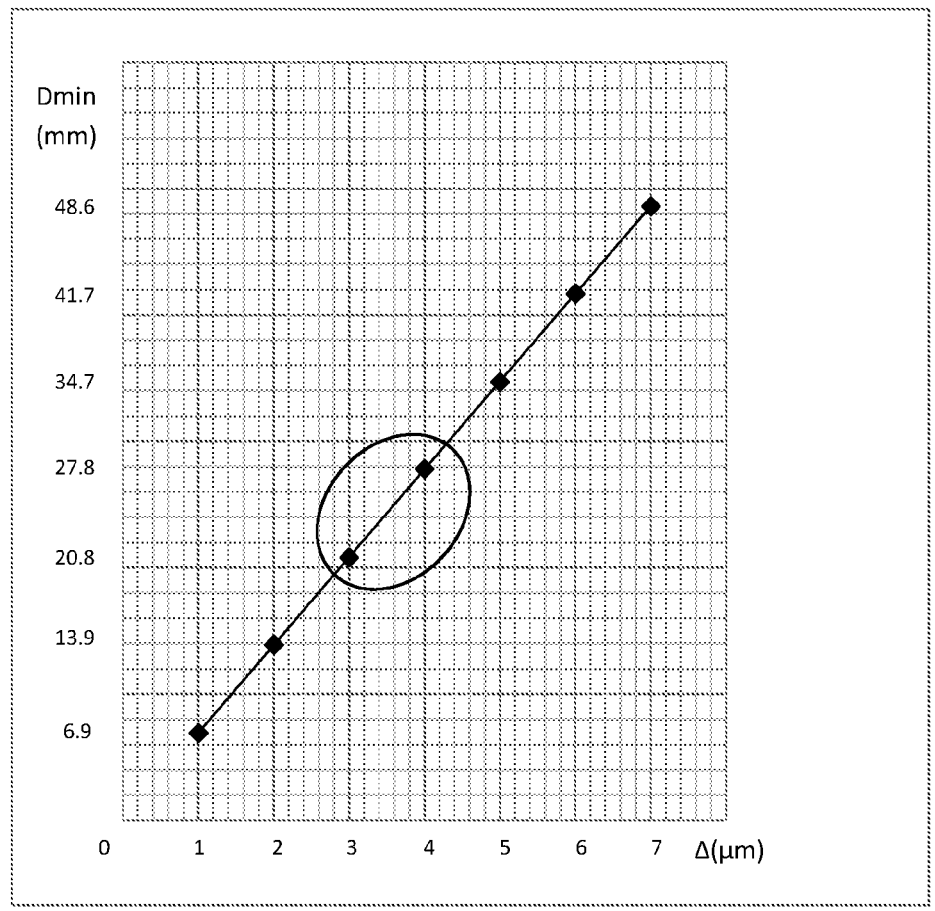
Figure 13B:
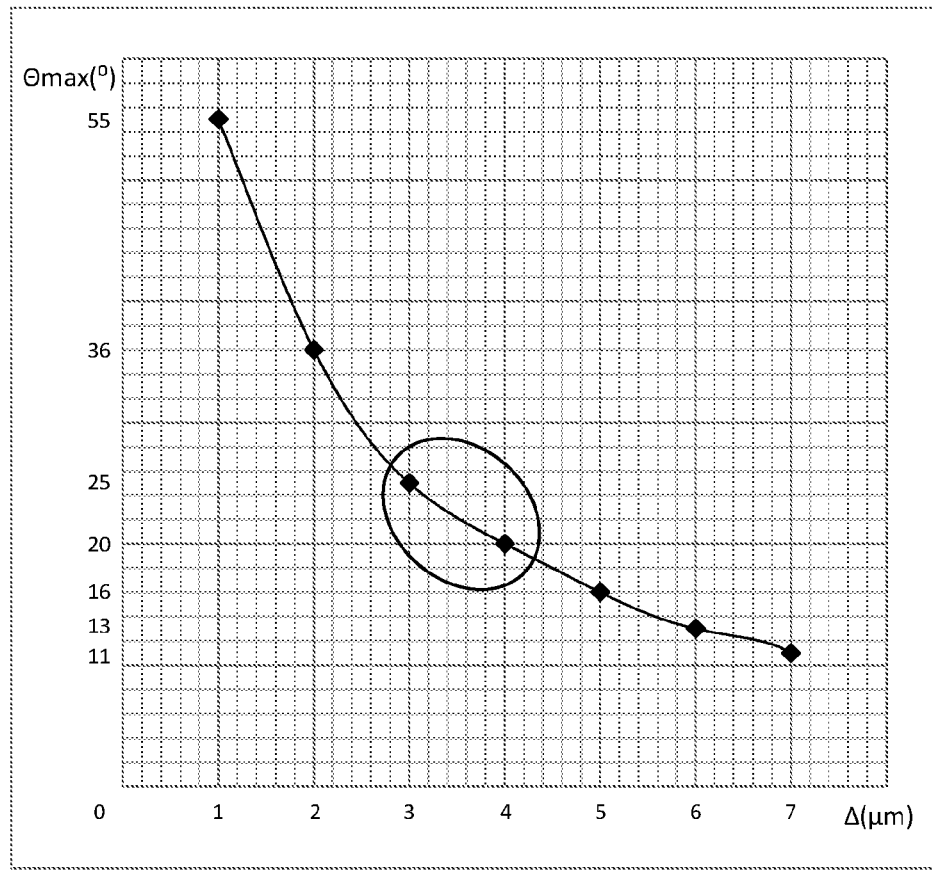

FIGS. 13a and 13b demonstrate graphs of minimum eye relief distance and field-of-view as a function of spatial light modulator pixel pitch.

Figure 14A:
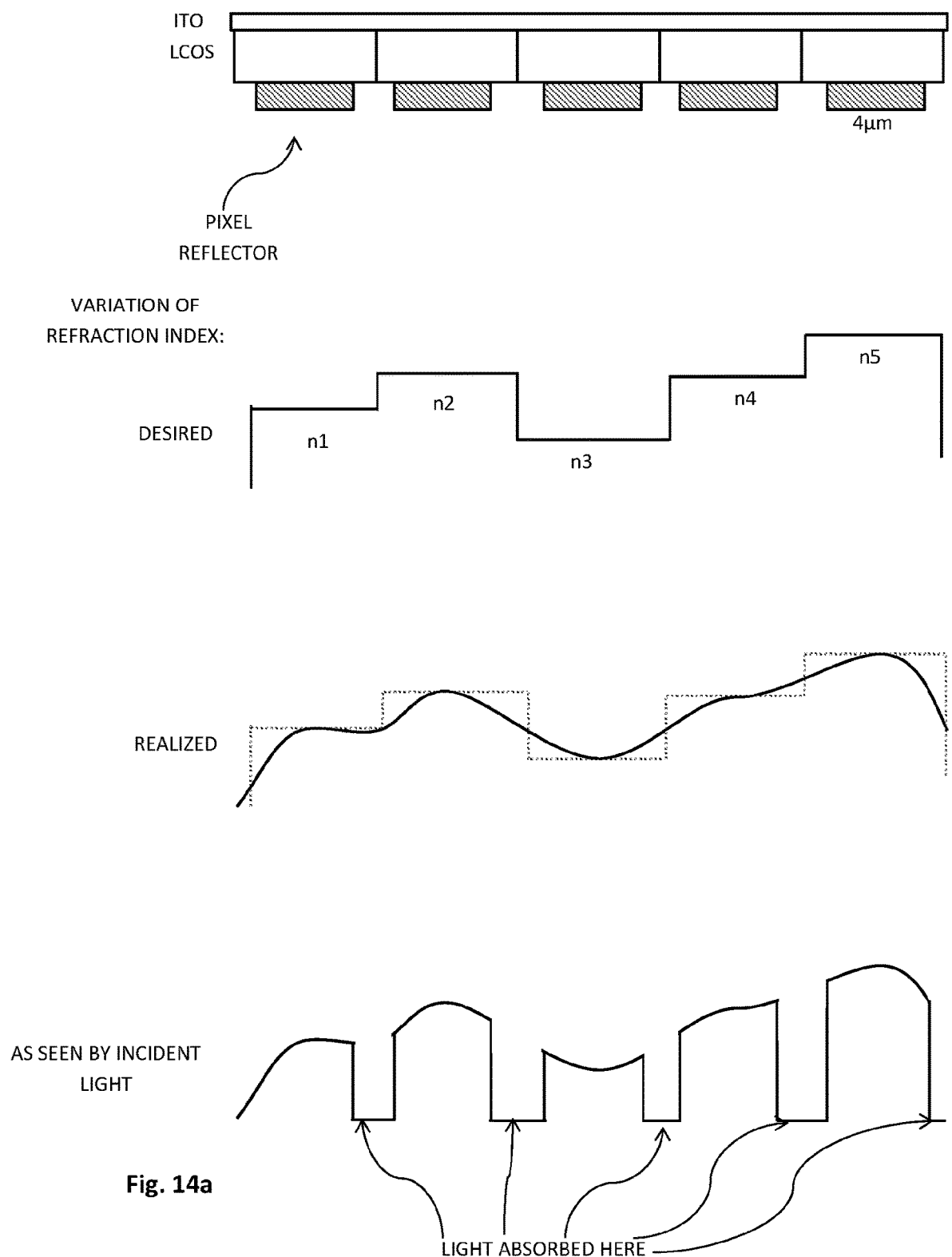
Figure 14B:
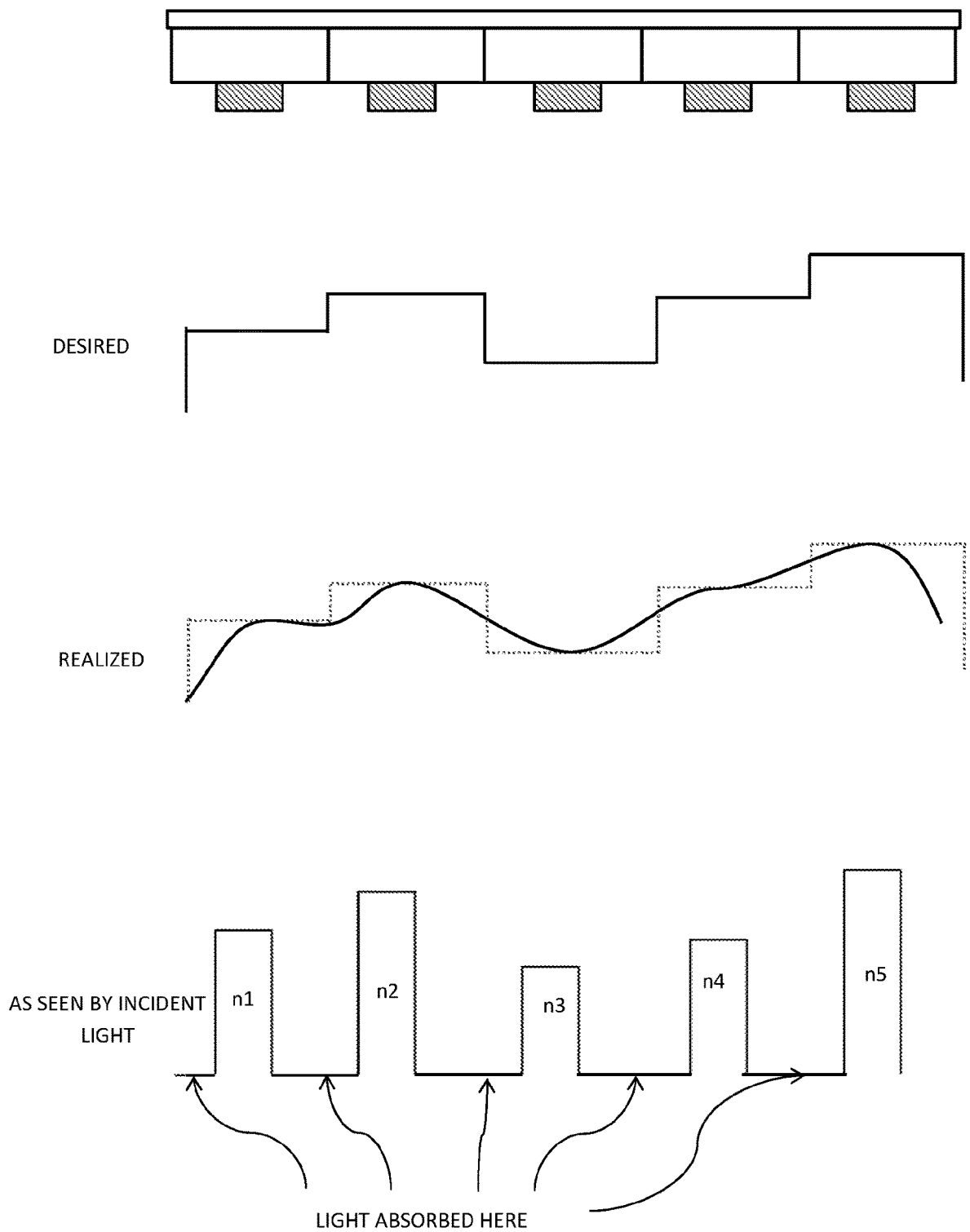

FIGS. 14a and 14b demonstrates effects of configurations with different pixel pitches and reflective or transmissive zone sizes in terms of cross-talk.

Figure 15:
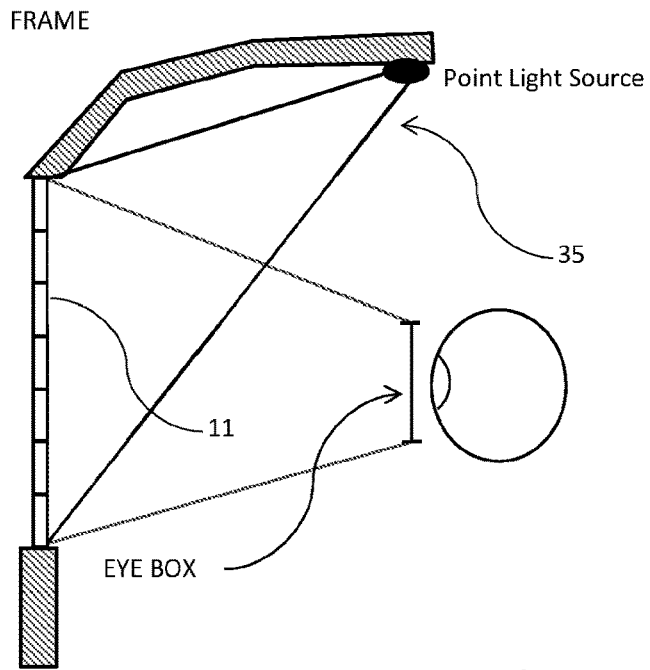

FIG. 15 demonstrates an optical architecture with a spatial light modulator and a point light source according to the present invention.

Figure 16A:
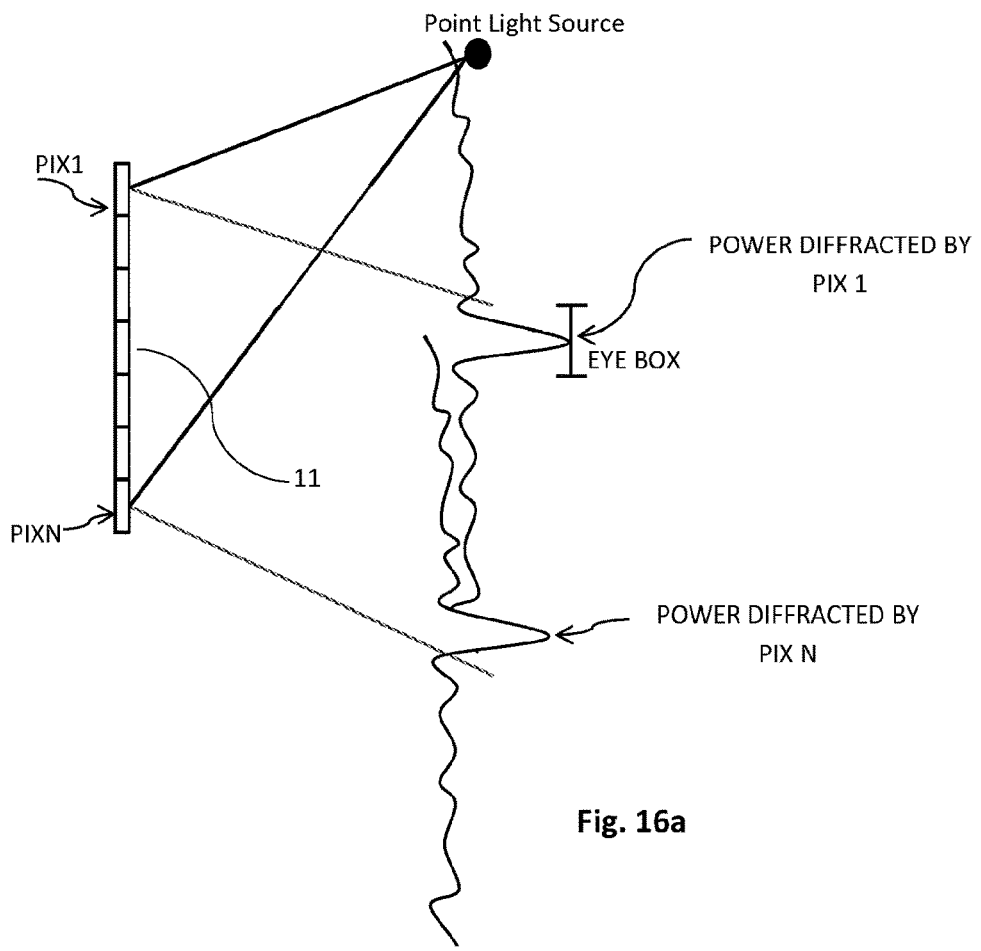
Figure 16B:
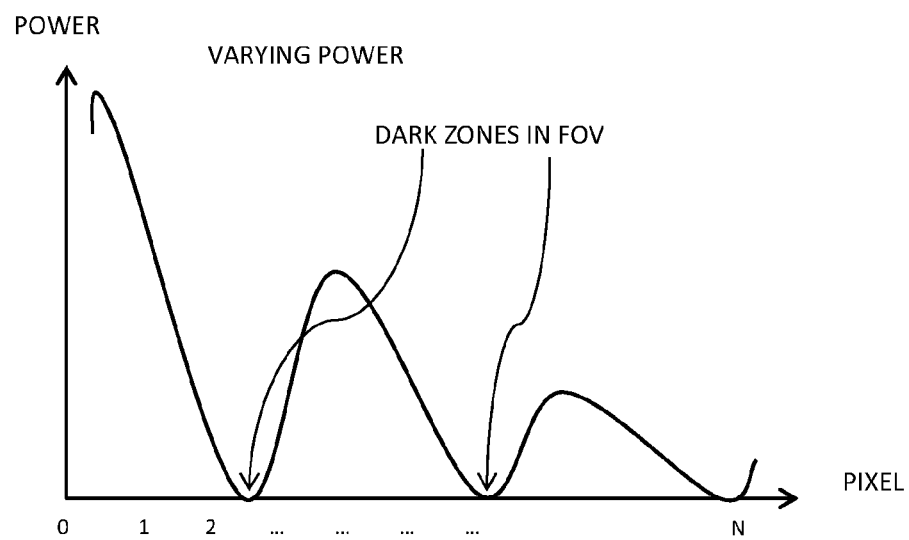
Figure 16C:
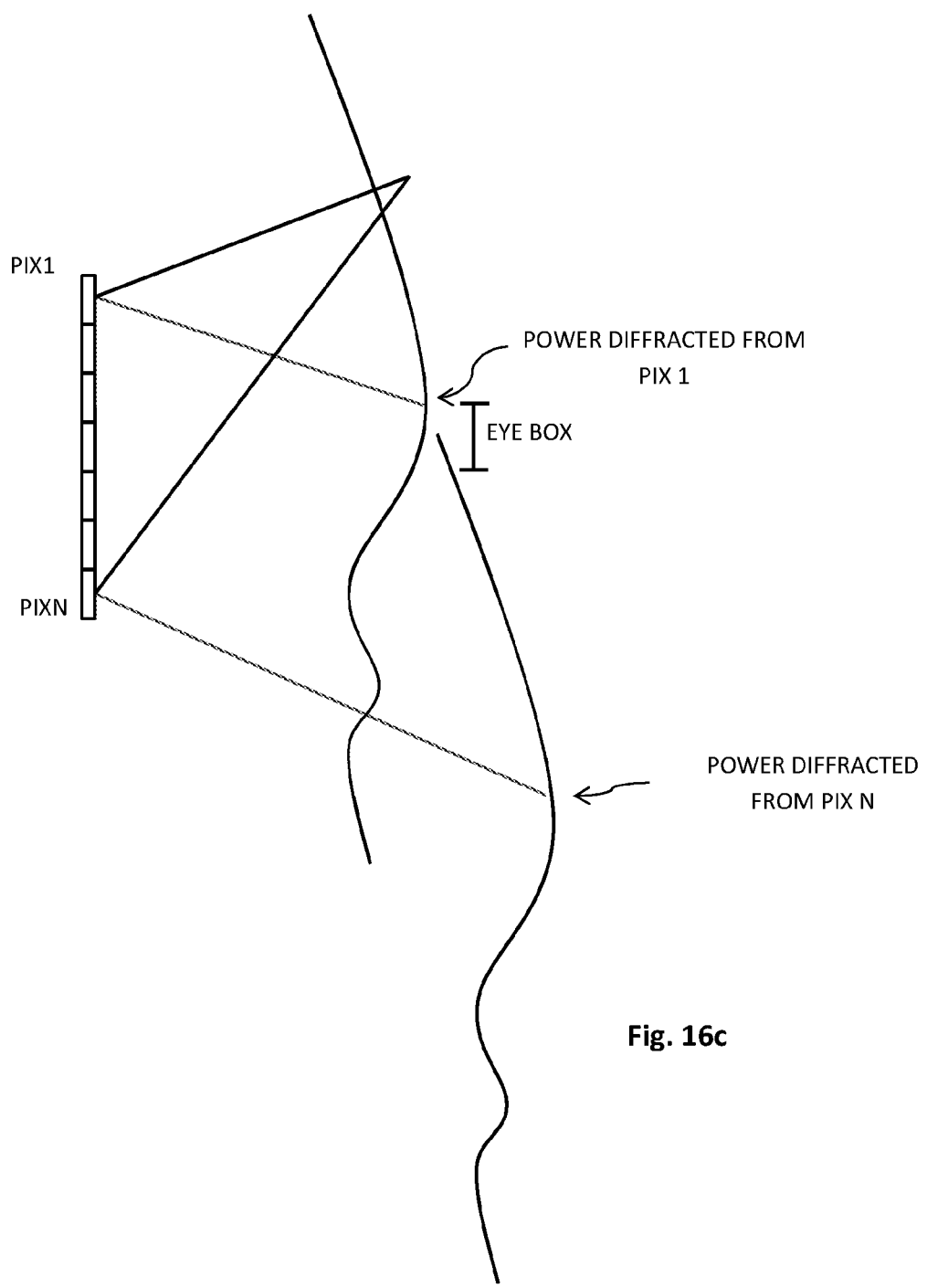
Figure 16D:
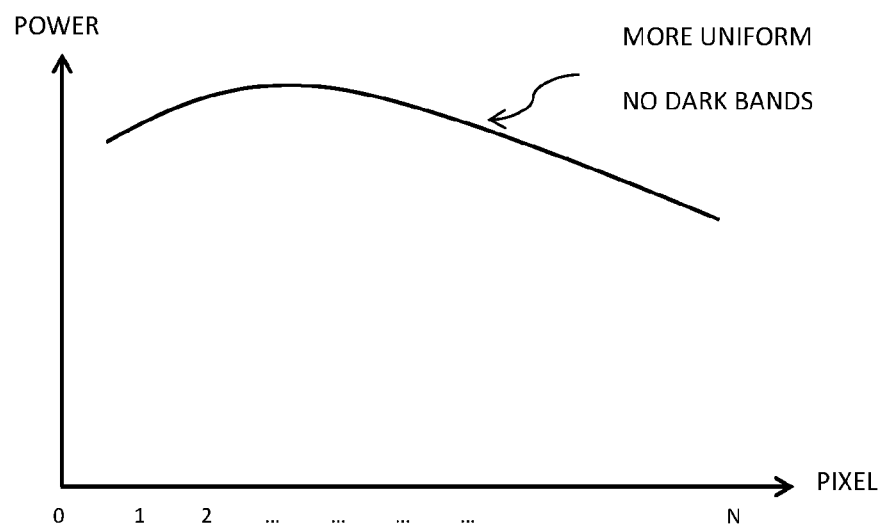

FIGS. 16a and 16b as well as 16c and 16d demonstrate effects of configurations with different pixel pitches and reflective or transmissive zone sizes in terms of power received from each pixel by eye box.

Figure 17:
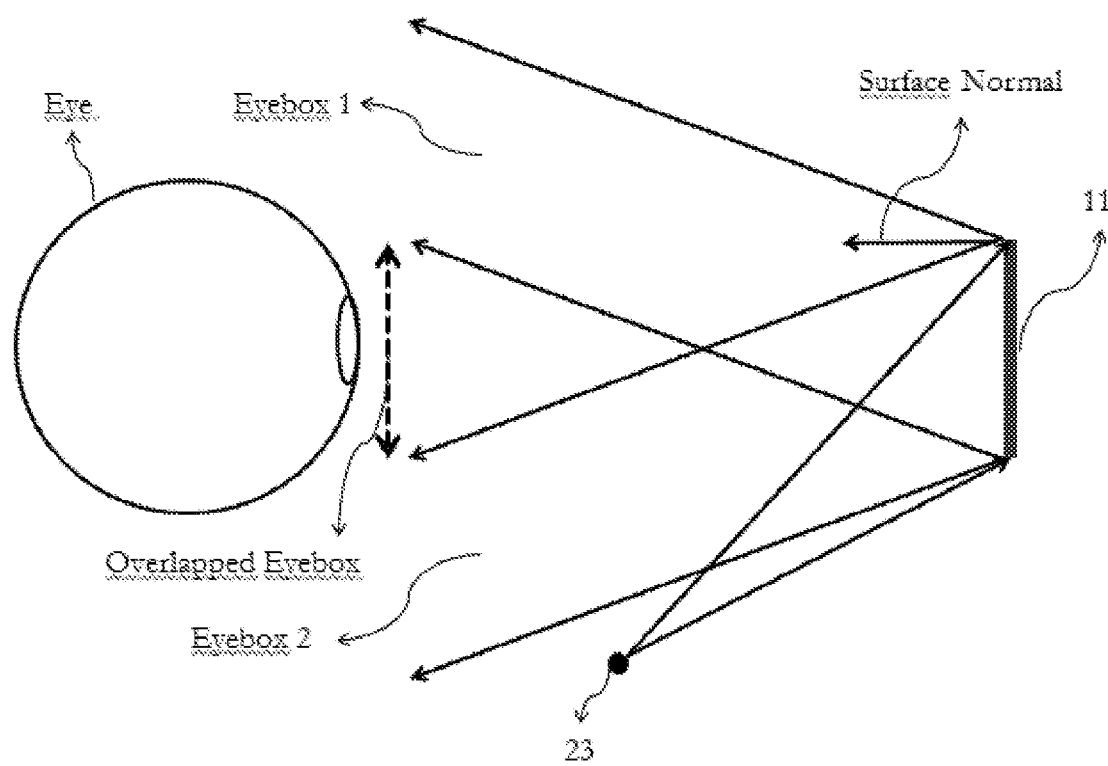

FIG. 17 demonstrates optical configuration when there is a micro-lens array in front of the liquid crystal layer to improve numerical aperture.

DETAILED DESCRIPTION OF THE PRESENT INVENTION

The following numerals are referred to in the detailed description of the present invention:
11) Spatial light modulator
12) Pixel
13) Pixel electrode
14) Absorbing layer
15) Reflective zone
16) Substrate
17) Liquid crystal layer
18) Glass cover
19) Top electrode
20) First alignment layer
21) Second alignment layer
22) Color pixel
23) Point light source
24) Transmissive zone
25) Reflective coating
26) Column electrode
27) Row electrode
28) Switch transistor
29) Tilted micro-mirror
30) Micro-lens array
31) Diffraction grating
32) Varying period diffraction grating
33) Low refractive index material
34) High refractive index material
35) Image display device The present invention discloses a micro-display device having a spatial light modulator (11) (SLM) in the form of an LCoS (Liquid Crystal on Silicon) setup, in which the CMOS controls the liquid crystal (LC) layer (17) through a matrix of transistors, each one of the latter representing an image pixel (12). Spatial light modulators are dynamically programmable diffractive optical elements. Among different spatial light modulator technologies, reflective spatial light modulators based on LCoS technology can be made to have much smaller pixel pitches as electronics can be buried under the pixel.

The present invention also discloses SLMs where pixels are formed on transmissive substrates. These devices can be used both in reflective and transmissive modes.

In the LCoS configuration, the liquid crystal layer (17) is in contact with a silicon chip manufactured through standard CMOS assembling methods. The electric field of the pixels (12) is independently controlled by the silicon chip. The pixel electrodes (13) complete the circuit with the CMOS and the liquid crystal layer (17).

The image display device (35) of the invention is a near-to-eye display device, which may include a frame in the shape of an eyeglass frame. The image display device (35) includes spatial light modulators (11) based on LCoS configuration and at least one point light source.

In operation, the near-to-eye image display device (35) may display a monochrome or full color video of a 2D or 3D virtual scene. For each video frame, the data on the spatial light modulator can be for instance a computer generated holographic image of the virtual scene. For each frame of the displayed video, a point light source (23) generates a coherent light wave of a single wavelength that illuminates a spatial light modulator (11) which spatially modulates the phase and/or amplitude of the incident wave and reflects it towards the eye of a user.

In reference to FIG. 1, the present invention proposes a spatial light modulator (11) as a micro-display in the form of an LCoS (Liquid Crystal on Silicon) setup, comprising a plurality of pixels (12) conventionally arranged in a 2D matrix. Each pixel (12) is represented by a pixel electrode (13) while a pixel aperture is formed by an upper absorbing layer (14) as will be delineated in detail hereinafter.

The spatial light modulator (11) of the invention is configured to reflect light only form a certain area of a pixel electrode (13) as depicted in FIG. 1 as well as FIG. 2, the latter demonstrating a cross-sectional view of the spatial light modulator (11) taken along line A-A' of FIG. 1, where the pixel electrodes (13) and the absorbing layer (14) are disposed on a substrate (16). Due to the fact that the absorbing layer (14) covers a substantially large area of each pixel electrode (13) except for the remaining pixel apertures forming reflective zones (15) from where light can reflect, substantially less cross-talk is observable in the liquid crystal (LC) layer (17), i.e. the electric field in the liquid crystal layer (17) may not produce cross-talk between adjacent pixels. In other words, light reflected from neighboring pixel apertures forming reflective zones (15) are less prone to cross-talk as the reflective zones (15) are configured to be located in a certain spaced-away positionment relative to each other. In a preferred embodiment according to the present invention, a pixel's (12) pitch is 4 µm×4 µm while a reflective zone's (15) size is 1 µm×1 µm. Alternatively, as demonstrated in FIGS. 2b to 2e, the optically active zones can be covered by tilted micro-mirrors (29), micro-lenses (30), diffraction gratings (31) or varying period diffraction gratings (32). The tilted micro-mirrors (29), micro-lenses (30), diffraction gratings (31) or varying period diffraction gratings (32) provide additional functionality to the optically active zones. Typically, while tilted micro-mirrors (29) perform deflection function, diffraction gratings (31) provide superior diffraction efficiency. Micro-lenses (30) can serve to the purpose of magnification. Varying period diffraction gratings (32) are effective in diffracting frequencies of light incident upon the grating into specific angles.

In reference to the embodiment as shown in FIG. 3 according to the present invention, the LCoS implementation of the micro-display device involves a first and a second alignment layers (respectively 20 and 21) interposing the liquid crystal layer (17), a glass cover (18) serving for protecting the micro-display system, a top electrode (19) and a CMOS substrate (16) on which the pixels (12) are disposed. The backplane of the micro-display device spatial light modulator (11) is non-transparent CMOS wafer where electronics are beneath the pixel electrodes (13).

The first and second alignment layers (20 and 21) maintain the liquid crystal layer (17) accurately positioned to direct light in an appropriate manner. In operation, the absorbing layer (14) blocks the light that may leak through in-between regions between the pixel electrodes (13) other than through the pixel apertures forming reflective zones (15).

The embodiments demonstrated in FIGS. 3b to 3d include micro-lens arrays (30) on the glass cover (18) surface close to the liquid crystal layer (17) in a spaced-away position relative to the optically active zones. These micro-lens arrays (30) advantageously increase the numerical aperture of the SLM. As viewed in FIG. 3b, the radius of curvature of the lenses is denoted by R and the location of the micro-lens array from the pixel electrodes is denoted by t. As an alternative embodiment, the micro-lens array (30) can be embedded in the top cover to provide a flat surface for liquid crystal interface. In the exemplary embodiments of FIGS. 3c and 3d, convex and concave lenses are used. In FIG. 3c, low refractive index material (33) layer has a lower refraction index than glass cover (18) whereas in FIG. 3d, high refractive index material (34) layer has a higher refractive index than glass cover (18) to provide focusing effect.

According to the present invention, the micro-display can be used for monochrome images; color images and video can be also shown using color sequential illumination. In reference to FIG. 4, color filters can be used on transparent or non-transparent substrates (16) to obtain color pixels (22) by way of coating the reflective zones (15) by color filters. As seen in FIG. 4, different color pixels (22) such as R, G or B pixels can be created by tiny color filters. Therefore, the micro-display can be used to show color images when the light source is white.

A plurality of pixel (12) geometries with pixel electrodes (13) having the same size and alike sub-pixel capacitances is possible as illustrated in FIGS. 5b to 5f.

Likewise, different pixel configurations on transparent and non-transparent substrates (16) are possible according to different embodiments as shown in FIGS. 6a to 6c.

FIG. 6a demonstrates the situation where a point light source (23) and the user, i.e. the user or wearer of the micro-display device (image display device (35)) are on the same side of the spatial light modulator (11). Therefore, the spatial light modulator (11) is a substantially planar medium having a first side and a second opposite side around the plane thereof. Typically, the wave reflected by the spatial light modulator (11) propagates towards the user's eye and forms a light wave distribution on an exit pupil plane, which is defined as the plane that lies in front of the user's eye, and corresponds to the expected location of the user's eye pupil. Part of the light wave distribution formed on the exit pupil plane is intercepted by the user's eye pupil and propagates to the retina, where a 3D image of the scene is formed.

A point light source (23) typically projects light to the micro-display device. It may be configured as any type of light source such as for instance a laser light source, an ultraviolet (UV) light source, an infrared (IR) light source, or other source of visible or non-visible light.

In the optical architecture of FIG. 6a, a spatial light modulator (11) based on LCoS configuration having pixels (12) with reflective zones (15) is placed directly in front of the user's eye and is illuminated by a point light source (23). Preferably, the image display device (35) is adapted in the shape of an eyeglass frame in which the two micro-displays of the image display device (35) are mounted to the frame in the glass positions thereof, whereas the point light source (23) is mounted to a frame portion away from the glass positions of the eyeglass frame. The system constitutes a non-see-through display as a non-transparent substrate (16) is used and the spatial light modulator (11) blocks the vision of real world.

In the optical architecture of FIG. 6b, the point light source (23) and the user of the image display device (35) are on opposite sides of the spatial light modulator (11). In this configuration, the spatial light modulator (11) is transmissive and the pixel apertures forming transmissive zones (24) as delimited by the absorbing layer (14) allow transmission of the light together with transparent pixel electrodes (13) and transparent substrate (16). Transparent pixel electrodes (13) are preferably made from indium tin oxide (ITO).

In the optical architecture of FIG. 6c, reflective zones (15) are created not by pixel apertures as delimited by the absorbing layer (14) as in FIG. 6a but by reflective coatings (25) configured to individually occupy identical surfaces as in the case of the reflective zones (15) of FIG. 6a. The reflective coatings (25) are attached to transparent pixel electrodes (13) disposed on a transparent substrate (16). The point light source (23) and the user are on the same side of the spatial light modulator (11).

The reflective zones (15) of FIG. 6a as well as the reflective coatings (25) of FIG. 6c can be coated with additional layers in the form of color filters. Likewise, the transmissive zones (24) of FIG. 6b can be coated with color filters.

In the case of transmissive zones (24) as in FIG. 6b and reflective coatings as in FIG. 6c, the spatial light modulator (11) is placed directly in front of the eye such that real world vision is not blocked.

In the case of FIG. 6b, the spatial light modulator (11) is illuminated by a point light source (23) mounted on the side of the eyeglass at a location that is further to the eye than the spatial light modulator (11) itself. The point light source (23) can be for example mounted on the nose bridge between the two spatial light modulator (11) (micro-displays of the image display device (35)) and the light generated by the point light source (23) is fed to a back light unit that illuminates the spatial light modulator (11) from the opposite side of the user. The system constitutes a see-through display of real world view.

The transmissive spatial light modulator (11) of FIG. 6b and the reflective spatial light modulator (11) of FIG. 6c can be reconfigured in the manner that the spatial light modulator (11) is placed at a position so that real world vision is not affected by its presence. The spatial light modulator (11) of FIG. 6b can be illuminated by a point light source (23) in the manner that the light transmitted by the spatial light modulator (11) is directed to the eye by a beam splitter. On the other hand, the spatial light modulator (11) of FIG. 6c can be illuminated by a point light source (23) in the manner that the light reflected by the spatial light modulator (11) is directed to the eye also by a beam splitter.

In reference to FIG. 7, the fabrication process of a micro-display on a transparent or non-transparent substrate with color filters can be carried out as delineated below. It is to be noted that use of a non-transparent substrate (16) corresponds to the configuration of FIG. 6a while FIG. 6b depicts use of a transparent substrate (16). The fabrication process comprises the initial step of making use of a CMOS surface in the case of FIG. 6a and a glass surface in the case of FIG. 6b. The pixel electrodes (13) are reflective and preferably metal in the case of FIG. 6a and transparent and preferably indium tin oxide (ITO) in the case of FIG. 6b. The fabrication process further comprises the steps of coating the pixel electrodes (13) on the substrate (16) with an absorbing layer (14) (black resin), patterning the absorbing layer (14) to respectively carve out reflective or transmissive zones (15 and 24; respectively correspond to FIGS. 6a and 6b configurations), coating with R-resin, patterning the R-resin to cover the respective color pixels (22) (R-pixels), coating with G-resin, patterning the G-resin to cover the respective color pixels (22) (G-pixels), coating with B-resin, patterning the B-resin to cover the respective color pixels (22) (B-pixels) and coating the resulting structure with an alignment layer (first alignment layer (20)).

Side and top views of a micro-display having a transmissive spatial light modulator (11) with transmissive zones are illustrated in FIGS. 8a and 8b. It is to be noted that the provision of having more area to fit switch transistors (28) under the absorbing layer (14) is of particular advantage in this configuration.

In reference to FIG. 9, the fabrication process of a micro-display on a transparent substrate (16) with reflective coatings (25) and color filters can be carried out as delineated below. The fabrication process comprises the initial step of making use of a transparent substrate (16) where there are transparent pixel electrodes (13). There are also transparent lines connecting pixels' (12) driver transistors to line and column drivers. The fabrication process further comprises the steps of coating the pixel electrodes (13) on the substrate (16) with a reflective layer of preferably metal such as aluminum, patterning the reflective layer using photolithography so as to obtain reflective coatings (25) of a predetermined size and shape, coating with R-resin, patterning the R-resin to cover the respective color pixels (22) (R-pixels), coating with G-resin, patterning the G-resin to cover the respective color pixels (22) (G-pixels), coating with B-resin and patterning the B-resin to cover the respective color pixels (22) (B-pixels).

According to the present invention, it is found that a pixel pitch in particular in the range of 3 µm×3 µm to 4 µm×4 µm and the size of a reflective zone (15), transmissive zone (24) or a reflective coating (25) size in particular around 1 µm×1 µm advantageously produce a series of technical effects as will be delineated hereinafter.

It is known that spatial light modulators generate higher diffraction orders as a result of their pixelated structure. These orders correspond to shifted replicas of virtual scenes that are to be displayed, which appear as ghost image replicas if they are allowed to enter the eye and propagate to the retina. In the case of spatial light modulators that essentially provide real valued modulation, such as binary spatial light modulators or amplitude only spatial light modulators, a conjugate beam will be formed. This conjugate beam, which corresponds to the wave emitted by a second virtual scene which is the mirror image of the actual virtual scene with respect to the exit pupil plane, should also be prevented from entering the eye.

It is well known that when a signal is sampled in the space domain, its spectrum is periodically replicated in the spatial frequency domain. Thus, the spectrum of the ideal holographic image that is intended to be displayed on the spatial light modulators is replicated as a result of sampling, where these replicas are referred to as "higher diffraction orders (HDO)." Since the pixel aperture function of practical spatial light modulators are space limited functions (having Fourier transforms consisting of decaying but non-limited tails), the replicas partially survive in the Fourier transform of the final analog mask implemented by the spatial light modulators, leading to observable higher diffraction orders.

FIG. 10 demonstrates the optical architecture of a head-worn image display. In FIG. 11, the spatial light modulator (11) generates higher diffraction copies of the eye box due to its pixelated structure as discussed above. With a pixel pitch, $\Delta$, at an eye relief distance, D, from a user's eye, the distance X between diffraction orders on the exit pupil plane can be approximated for small angles as $X=\lambda D/\Delta$ as shown in FIG. 11, where $\lambda$ is the wavelength of light incident on the spatial light modulator (11). It should be noted that the distance between diffraction order copies are independent of the nature of the illumination wave (converging, diverging or collimated) used for the spatial light modulator (11).

In order to have a clear eye box, WEB being defined as the width of eye box (exit pupil) of display, WEB should be smaller than $\lambda D/\Delta$. In view of the fact that the eye pupil should be smaller than the eye box (WEP<WEB with WEP being defined as width of eye pupil (WEP) of user), the condition for clear image formation can be defined as WEP<$\lambda \lambda/\Delta$ and $\Delta$<$\lambda D$/WEP. FIG. 12a demonstrates higher diffraction copies generated by a spatial light modulator (11) respectively in the case of a clear eye box and a contaminated eye box and FIG. 12b demonstrates the condition for clear retinal image formation with no ghost artifacts.

FIG. 13a demonstrates graph of minimum allowable eye relief distance as a function of spatial light modulator (11) pixel pitch. For $\lambda$=432 mm (Blue) and WEP=3 mm (average expected size), the graph in FIG. 13a shows minimum allowable eye relief distance, $D_{min}$, as a function of $\Delta$ such that $\Delta$<$\lambda D$/WEP is satisfied. For 3 to 4 µm pixel pitch, minimum eye relief distance changes from 20.8 mm to 27.8 mm. Therefore, 3 to 4 µm pixel pitch is desirable since they result in relatively small eye relief distance.

In reference to FIG. 10, the field-of-view (FOV) provided by the system is given as follows: $\theta_{FOV}=2\tan^{-1}(w_{SLM}/2D)$, where $w_{SLM}$ is the width of the spatial light to modulator (11). For $w_{SLM}$=20 mm, the graph of FIG. 13b shows the maximum allowable field-of-view, $\theta_{MAX}$, as a function of Δ. Accordingly, a pixel pitch of 3-4 μm allows the design of a head-wearable image display device (35) with a reasonable eye relief distance and a reasonable field-of-view for realizing a foveated display.

FIGS. 14a and 14b demonstrates effects of configurations with different pixel pitches and reflective or transmissive zone sizes in terms of cross-talk. The first example case respectively involves a pixel pitch of 4 μm and a reflective or transmissive zone (15, 24; also including the reflective coating (25) option) dimension of 3.8 μm and in the second case (FIG. 14b), the pixel pitch is 4 μm and the reflective or transmissive zone (15, 24) dimension is 1 μm. In both cases, the ideal refractive index variation corresponds to a stepwise function such that within a pixel refractive index has a uniform value. However, due to the fringing electric fields within the liquid crystal, in reality the desired refractive index values are realized only within a small region (around 1 μm) around the center of each pixel, and the refractive index distribution in the remaining regions have a smooth transition between desired values. In the case illustrated in FIG. 14a, since reflective or transmissive zone width is large, the incident light is exposed to much of the above described undesired variation. Hence, reconstructed images are corrupted by crosstalk noise. In the case illustrated in FIG. 14b, since the reflective or transmissive zone has a narrower width, the incident light mostly experiences the desired refractive index, and the refractive index variations in the transition regions are of no concern. Therefore, the reconstructed image becomes much less corrupted by pixel crosstalk noise.

FIG. 15 demonstrates an optical architecture with a spatial light modulator (11) (SLM) and a point light source according to the present invention. In view of the same example cases of FIGS. 14a and 14b, FIGS. 16a and 16b indicate that since the light diffracted from each pixel has a small spread around specular reflection (due to the fact that reflective zones have a large width), power level received from each pixel (12, PIX 1 to PIX N) by eye box exhibits a great variation over the field-of-view where from some pixels no power is received at all leading to formation of dark zones in the field-of-view. On the other hand, 16c and 16d illustrate that since the light diffracted from each pixel has a much larger spread around specular reflections (due to the fact that reflective zones have a small width, about 1 μm), a more uniform light power is intercepted from each pixel of the spatial light modulator (11) and no dark zones are formed where no light is received.

FIGS. 3b to 3c show SLM implementation using a micro-lens array (30). This configuration further improves the numerical aperture of the SLM. Radius of curvature (FIG. 3b, R) of the micro-lenses controls the eye box size for each pixel. By changing the distance between the micro-lens array (30) and the SLM electrode surface (FIG. 3b, t) chief rays of the reflected light can be made parallel to the surface normal of the SLM regardless of the incidence angle, which creates an efficient overlapped eye box at the pupil plane as shown in FIG. 17.

In accordance with the invention, the optical setup with a micro-lens array (30) being disposed in front of the liquid crystal layer (17) to improve numerical aperture can be schematically demonstrated, by which expansion of the numerical aperture from the spatial light modulator (11) is viewed in FIG. 17 with two eye boxes and the overlapped zone.

In a nutshell, the present invention proposes a spatial light modulator (11) comprising a liquid crystal (LC) layer (17) interposed by a top electrode (19) and a two-dimensional array of pixels (12) in where each pixel (12) is represented by a pixel electrode (13) such that the liquid crystal (LC) layer (17) is controlled through the array of pixel electrodes (13).

According to one embodiment of the present invention, each pixel electrode (13) is configured to have an at least one optically active zone in the form of a reflective zone (15), a transmissive zone (24) or a reflective coating (25).

According to a further embodiment of the present invention, said at least one optically active zones in the form of a reflective zone (15), a transmissive zone (24) or a reflective coating (25) only partially cover the surface of each pixel electrode (13) and are configured to be located in a spaced-away positionment relative to each other in the manner that light reflected from or transmitted through neighboring at least one optically active zones in each pixel (12) is diffracted to create an angular spread such that ratio of the smallest dimension of an optically active zone to incident light wavelength is between 1 and 5.

According to a further embodiment of the present invention, the smallest dimension of the optically active zone is from 2 to 4 times the wavelength of the incident light.

According to a further embodiment of the present invention, the optically active zones are covered by tilted micro-mirrors (29), micro-lenses, diffraction gratings (31) or varying period diffraction gratings (32).

According to a further embodiment of the present invention, the optically active zone is arranged in the form of a pixel-to-pixel varying period diffraction grating (32) whereby uniform power distribution is ensured in the case of an off-axis reflection or transmission of light from a diverging light source.

According to a further embodiment of the present invention, said optically active zones are reflective zones (15) or reflective coatings (25) configured in the form of tilted micro-mirrors (29) with different tilts.

According to a further embodiment of the present invention, said optically active zones are coupled to micro-lenses.

According to a further embodiment of the present invention, said spatial light modulator (11) is a phase-only or amplitude-only spatial light modulator.

According to a further embodiment of the present invention, an optically active zone's size is approximately 1 μm×1 μm to 3 μm×3 μm. A pixel's (12) pitch is preferably 3 μm×3 μm to 4 μm×4 μm.

According to a further embodiment of the present invention, an image display device (35) is proposed; comprising at least one point light source (23) and at least one micro-display device in the form of a spatial light modulator (11) being positioned to be illuminated by said at least one point light source (23).

According to a further embodiment of the present invention, the image display device (35) in the form of a near-to-eye display device including a frame in the shape of an eyeglass frame comprises two spatial light modulators (11) mounted to the frame in the glass positions thereof.

According to a further embodiment of the present invention, a pixel aperture is formed by an absorbing layer (14) covering a pixel electrode (13), said pixel aperture delimited by the absorbing layer (14) defining a reflective zone (15) on the pixel electrode (13) from where light can reflect.

According to a further embodiment of the present invention, the pixel electrode (13) as covered by said absorbing layer (14) are disposed on a non-transparent CMOS substrate (16).

According to a further embodiment of the present invention, color filters are coated on the reflective zones (15) to obtain color pixels (22).

According to a further embodiment of the present invention, the image display device (35) is a head-worn device.

According to a further embodiment of the present invention, the spatial light modulator (11) is a substantially planar medium having a first side and a second opposite side around the plane thereof in the manner that at least one point light source (23) is located at a first first side region relative to the spatial light modulator (11) and light reflects from said reflective zones (15) on the pixel electrodes (13) towards a second first side region relative to the spatial light modulator (11).

According to a further embodiment of the present invention, the point light source (23) is mounted to a frame portion away from the glass positions of the eyeglass frame.

According to a further embodiment of the present invention, a pixel aperture is formed by an absorbing layer (14) covering a pixel electrode (13), said pixel aperture delimited by the absorbing layer (14) defining a transmissive zone (24) on the pixel electrode (13) from where light passes.

According to a further embodiment of the present invention, transparent pixel electrodes (13) as covered by said absorbing layer (14) are disposed on a transparent substrate (16).

According to a further embodiment of the present invention, transparent pixel electrodes (13) are made from indium tin oxide.

According to a further embodiment of the present invention, the spatial light modulator (11) is a substantially planar medium having a first side and a second opposite side around the plane thereof in the manner that said at least one point light source (23) is located at a second side region relative to the spatial light modulator (11) and light passes through said transmissive zone (24) on the pixel electrode (13) towards a first side region relative to the spatial light modulator (11).

According to a further embodiment of the present invention, the at least one point light source (23) is mounted on a nose bridge portion of said eyeglass frame between the two spatial light modulators (11) and the light generated by the point light source (23) is fed to a back light unit that illuminates the spatial light modulator (11) from the second side region relative to the spatial light modulator (11).

According to a further embodiment of the present invention, reflective coatings (25) configured to individually occupy only a partially delimited surface portion of each pixel electrode (13) are attached to said pixel electrodes (13) so as to allow reflection of light.

According to a further embodiment of the present invention, transparent pixel electrodes (13) as partially covered by said reflective coatings (25) are disposed on a transparent substrate (16).

According to a further embodiment of the present invention, the spatial light modulator (11) is a substantially planar medium having a first side and a second opposite side around the plane thereof in the manner that said at least one point light source (23) is located at a first first side region relative to the spatial light modulator (11) and light reflects from said reflective coatings (25) on the pixel electrodes (13) towards a second first side region relative to the spatial light modulator (11).

According to a further embodiment of the present invention, color filters are coated on the transmissive zones (15) or reflective coatings (25) to obtain color pixels (22).

According to a further embodiment of the present invention, the light transmitted by the spatial light modulator (11) is directed towards the first side region relative to the spatial light modulator (11) by a beam splitter.

According to a further embodiment of the present invention, the light reflected by the spatial light modulator (11) is directed towards the second first side region relative to the spatial light modulator (11) by a beam splitter.

According to a further embodiment of the present invention, light projected by the spatial light modulator (11) includes multiple diffraction orders produced by the same.

According to a further embodiment of the present invention, the point light source (23) comprises an LED or a laser light source.

According to a further embodiment of the present invention, the point light source (23) comprises a red LED, a green LED and a blue LED.

According to a further embodiment of the present invention, the optically active zones are covered by micro-lenses forming micro-lens arrays (30) on a glass cover (18) surface substantially close to the liquid crystal layer (17) in a spaced-away position relative to the optically active zones.

According to a further embodiment of the present invention, the optically active zones are covered by micro-lenses forming micro-lens arrays (30) embedded within a glass cover (18) in a spaced-away position relative to the optically active zones to provide a flat surface for the liquid crystal layer (17).

According to a further embodiment of the present invention, the micro-lens arrays (30) have convex or concave lenses in the manner that a low refractive index material (33) layer has a lower refraction index than the glass cover (18) or a high refractive index material (34) layer has a higher refractive index than glass cover (18).

According to a further embodiment of the present invention, a method for manufacturing a micro-display is proposed, comprising the steps of, a) disposing pixel electrodes (13) of in the range of 3 µm×3 µm to 4 µm×4 µm on a substrate (16), b) coating pixel electrodes (13) with an absorbing layer (14), c) patterning the absorbing layer (14) to respectively carve out reflective zones (15) or transmissive zones (24) and d) forming central pixel apertures of around 1 µm×1 µm size on the absorbing layer (14), each pixel aperture corresponding to a substantially central surface area of a pixel electrode (13). According to a further embodiment of the present invention, the method further comprises the steps of coating the pixel apertures with R-resin, patterning the R-resin to cover respective color pixels (22), coating with G-resin, patterning the G-resin to cover respective color pixels (22), coating with B-resin, patterning the B-resin to cover respective color pixels (22) and coating the resulting structure with an alignment layer.

According to a further embodiment of the present invention, the substrate (16) is a non-transparent CMOS substrate or a transparent substrate (16).

According to a further embodiment of the present invention, pixel electrodes (13) are reflective and preferably metal or transparent and preferably indium tin oxide.

According to a further embodiment of the present invention, a further method for manufacturing a micro-display is proposed, comprising the steps of, a) disposing pixel electrodes (13) of in the range of 3 µm×3 µm to 4 µm×4 µm on a substrate (16), b) coating pixel electrodes (13) with a reflective metal layer, c) patterning the reflective layer using photolithography so as to obtain reflective coatings (25) and d) forming reflective coatings (25) of around 1 μm×1 μm size on the pixel electrodes (13), each reflective coating (25) corresponding to a substantially central surface area of a pixel electrode (13).

According to a further embodiment of the present invention, pixel electrodes (13) and the substrate (16) are transparent.

The invention claimed is:

1. An image display device (35) comprising
at least one point light source (23) and at least one micro-display device in the form of a spatial light modulator (11) being positioned to be illuminated by said at least one point light source (23), said spatial light modulator (11) comprising a liquid crystal layer (17) interposed by a top electrode (19) and a two-dimensional array of pixels (12), wherein each pixel (12) is represented by a pixel electrode (13) having a surface such that the liquid crystal layer (17) is controlled through the array of pixel electrodes (13), characterized in that:
each pixel electrode (13) is configured to have at least one optically active zone,
wherein said at least one optically active zone is in the form of a reflective zone (15), a transmissive zone (24) or a reflective coating (25) only partially covering the surface of each pixel electrode (13), wherein said at least one optically active zone is located in a spaced-away position relative to each neighboring optically active zone such that light reflected from or transmitted through neighboring optically active zones to each pixel (12) is diffracted to create an angular spread such that ratio of the smallest dimension of an optically active zone to incident light wavelength is between 2 and 4, and:
said optically active zone is smaller than the pixel electrode (13),
said optically active zone is delimited by an absorbing layer (14), and
said spatial light modulator (11) is configured to display a phase-only computer-generated hologram.

2. The image display device (35) as set forth in claim 1, characterized in that the optically active zones are covered by either tilted micro-mirrors (29), micro-lenses, diffraction gratings (31) or varying period diffraction gratings (32).

3. The image display device (35) as set forth in claim 1, characterized in that the optically active zone is arranged in the form of a pixel-to-pixel varying period diffraction grating (32) whereby uniform power distribution is ensured in the case of an off-axis reflection or transmission of light from a diverging light source.

4. The image display device (35) as set forth in claim 1, characterized in that said optically active zones are reflective zones (15) or reflective coatings (25) configured in the form of tilted micro-mirrors (29) with different tilts.

5. The image display device (35) as set forth in claim 1, characterized in that said optically active zones are coupled to micro-lenses.

6. The image display device (35) as set forth in claim 1, characterized in that said spatial light modulator (11) is a phase-only or amplitude-only spatial light modulator.

7. The image display device (35) as set forth in claim 1, characterized in that an optically active zone's smallest dimension is at least 0.5 μm x 0.5 μm.

8. The image display device (35) as set forth in claim 1, characterized in that the image display device (35) in the form of a near-to-eye display device including a frame in the shape of an eyeglass frame comprises two spatial light modulators (11) mounted to the frame in the glass positions thereof.

9. The image display device (35) as set forth in claim 1, characterized in that, for each a pixel aperture is formed by an absorbing layer (14) covering a pixel electrode (13), said pixel aperture delimited by the absorbing layer (14) defining a reflective zone (15) on the pixel electrode (13) from where light can reflect.

10. The image display device (35) as set forth in claim 9, characterized in that the pixel electrode (13) as covered by said absorbing layer (14) is disposed on a non-transparent CMOS substrate (16).

11. The image display device (35) as set forth in claim 9, characterized in that color filters are coated on the reflective zones (15) to obtain color pixels (22).

12. The image display device (35) as set forth in claim 1, characterized in that the image display device (35) is a head-worn device.

13. The image display device (35) as set forth in claim 12, characterized in that the spatial light modulator (11) is a substantially planar medium having a first side and a second opposite side around the plane thereof in the manner that at least one point light source (23) is located at a first side region relative to the spatial light modulator (11) wherein said at least one optically active zone of each pixel electrode is in the form of a reflective zone (15), and light reflects from said reflective zone (15) on the pixel electrode (13) towards a second first side region relative to the spatial light modulator (11).

14. The image display device (35) as set forth in claim 12, characterized in that the point light source (23) is mounted to a frame portion away from the glass positions of the eyeglass frame.

15. The image display device (35) as set forth in claim 1, characterized in that a pixel aperture is formed by an absorbing layer (14) covering a pixel electrode (13), said pixel aperture delimited by the absorbing layer (14) defining a transmissive zone (24) on the pixel electrode (13) from where light passes.

16. The image display device (35) as set forth in claim 15, characterized in that transparent pixel electrodes (13) as covered by said absorbing layer (14) are disposed on a transparent substrate (16).

17. The image display device (35) as set forth in claim 12, characterized in that the spatial light modulator (11) is a substantially planar medium having a first side and a second opposite side around the plane thereof in the manner that said at least one point light source (23) is located at a second side region relative to the spatial light modulator (11) and light passes through said transmissive zone (24) on the pixel electrode (13) towards a first side region relative to the spatial light modulator (11).

18. The image display device (35) as set forth in claim 1, wherein each pixel electrode (13) has a minimum dimension of 2 μm x 2 μm.

19. The image display device (35) as set forth in claim 1, wherein the angular spread between light diffracted by neighboring pixel's optically active zones relative to the modulated light directed toward a pupil of a user's eye by the respective pixel prevents overlap at the pupil of the user's eye between the neighboring pixel's diffracted light and the respective pixel's modulated light.

20. The image display device (35) as set forth in claim 1, wherein each pixel electrode (13) has a minimum dimension of 2 μm x 2 μm, and wherein the at least one optically active zone's smallest dimension is at least 0.5 μm x 0.5 μm.

21. An image display device comprising
at least one point light source and at least one microdisplay device in the form of a spatial light modulator positioned to be illuminated by incident light from the at least one point light source, wherein the incident light has a wavelength, and wherein the spatial light modulator includes a liquid crystal layer interposed by a top electrode and a two-dimensional array of pixels, wherein each pixel is represented by a pixel electrode having a surface such that the liquid crystal layer is controlled through the array of pixel electrodes,
wherein each pixel electrode includes an optically active zone,
wherein the optically active zone is in the form of a reflective zone, wherein the optically active zone is located in a spaced-away position relative to each neighboring optically active zone such that light reflected from neighboring optically active zones to each pixel is diffracted to create an angular spread such that the optically active zone has a smallest dimension that is 2 to 4 times the wavelength of the incident light,
wherein the optically active zone is smaller than the pixel electrode,
wherein the optically active zone is delimited by an absorbing layer, and
wherein the spatial light modulator is configured to display a phase-only computer-generated hologram.

22. An image display device comprising
at least one point light source and at least one microdisplay device in the form of a spatial light modulator positioned to be illuminated incident light from by the at least one point light source, wherein the incident light has a wavelength, and wherein the spatial light modulator includes a liquid crystal layer interposed by a top electrode and a two-dimensional array of pixels, wherein each pixel is represented by a pixel electrode having a surface such that the liquid crystal layer is controlled through the array of pixel electrodes,
wherein each pixel electrode includes an optically active zone,
wherein the optically active zone is in the form of a reflective coating only partially covering the surface of each pixel electrode, wherein the optically active zone is located in a spaced-away position relative to each neighboring optically active zone such that light reflected from or transmitted through neighboring optically active zones to each pixel is diffracted to create an angular spread such that the optically active zone has a smallest dimension that is 2 to 4 times the wavelength of the incident light,
wherein the optically active zone is smaller than the pixel electrode,
wherein the optically active zone is delimited by an absorbing layer, and
wherein the spatial light modulator is configured to display a phase-only computer-generated hologram.

* * * * *